US012613649B2

(12) United States Patent
Kang et al.

(10) Patent No.: US 12,613,649 B2
(45) Date of Patent: Apr. 28, 2026

(54) SUB-BLOCK BASED STORAGE DEVICE AND MANAGEMENT METHOD THEREOF

(71) Applicant: SAMSUNG ELECTRONICS CO., LTD., Suwon-si (KR)

(72) Inventors: Jiyeun Kang, Suwon-si (KR); In Hwan Doh, Suwon-si (KR); Young-Ho Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/891,874

(22) Filed: Sep. 20, 2024

(65) Prior Publication Data

US 2025/0251870 A1      Aug. 7, 2025

(30) Foreign Application Priority Data

Feb. 2, 2024      (KR) ........................ 10-2024-0016429

(51) Int. Cl.
*G06F 3/06*              (2006.01)

(52) U.S. Cl.
CPC ............ G06F 3/064 (2013.01); G06F 3/0611 (2013.01); G06F 3/0679 (2013.01)

(58) Field of Classification Search
CPC ....... G06F 3/064; G06F 3/0611; G06F 3/0679
See application file for complete search history.

(56) References Cited

U.S. PATENT DOCUMENTS

| | | | |
|---|---|---|---|
| 9,652,381 B2 | 5/2017 | Higgins et al. | |
| 9,715,444 B2 | 7/2017 | Lee et al. | |
| 9,946,643 B2 | 4/2018 | Kanno | |
| 10,430,083 B2 | 10/2019 | Kim et al. | |
| 10,467,133 B2 | 11/2019 | Perlstein et al. | |
| 11,461,227 B2 | 10/2022 | You | |
| 2013/0326119 A1 | 12/2013 | Lee et al. | |
| 2015/0370701 A1 | 12/2015 | Higgins et al. | |
| 2016/0267004 A1 | 9/2016 | Perlstein et al. | |
| 2017/0168929 A1 | 6/2017 | Kanno | |
| 2019/0042102 A1 | 2/2019 | Kim et al. | |
| 2019/0286556 A1* | 9/2019 | You ..................... G06F 12/0246 |
| 2020/0409836 A1 | 12/2020 | You | |

(Continued)

FOREIGN PATENT DOCUMENTS

JP              4691348 B2      6/2011

*Primary Examiner* — Kevin Verbrugge
(74) *Attorney, Agent, or Firm* — Sughrue Mion, PLLC

(57)              ABSTRACT

A sub-block-based storage device includes a memory device configured to include a plurality of memory blocks, a work memory storing instructions, and a memory controller communicatively coupled with the memory device and the work memory and configured to manage the plurality of memory blocks. Each block of the plurality of memory blocks includes a plurality of sub-blocks having different capacities. The memory controller is configured to execute the instructions to manage used sub-blocks which store valid data from among the plurality of sub-blocks, manage free sub-blocks which are empty from among the plurality of sub-blocks, select a garbage collection source block from the used sub-blocks, select candidate destination blocks by comparing a size of valid data stored in the garbage collection source block and each of sizes of the free sub-blocks, and select a garbage collection destination block from the candidate destination blocks.

20 Claims, 15 Drawing Sheets

(56)     References Cited

U.S. PATENT DOCUMENTS

| 2024/0069789 A1* | 2/2024 | Oh | G06F 12/0253 |
| 2024/0354007 A1* | 10/2024 | Gopalakrishnan | G06F 3/0616 |
| 2025/0094078 A1* | 3/2025 | Oh | G06F 12/0253 |
| 2025/0244917 A1* | 7/2025 | Seok | G06F 3/0604 |

* cited by examiner

SUB-BLOCK BASED STORAGE DEVICE AND MANAGEMENT METHOD THEREOF

CROSS-REFERENCE TO RELATED APPLICATIONS

This application claims benefit of priority under 35 U.S.C. § 119 to Korean Patent Application No. 10-2024-0016429, filed on Feb. 2, 2024, in the Korean Intellectual Property Office, the disclosures of which is incorporated by reference herein in its entirety.

BACKGROUND

1. Field

The present disclosure relates generally to a semiconductor memory device, and more particularly, to a sub-block based storage device and a method for managing a sub-block.

2. Description of Related Art

A semiconductor memory may be classified as a volatile memory or a non-volatile memory. Read and write speeds of the volatile memory (e.g., a dynamic random access memory (DRAM), a static random access memory (SRAM), or the like) may be relatively fast, however, the data stored in the volatile memory may be lost when a power applied to the volatile memory is turned off. Alternatively, the non-volatile memory may retain data stored in the non-volatile memory even when the power applied to the non-volatile memory is turned off. Consequently, non-volatile memory may be used to store contents that may need to be preserved regardless of whether power is applied or not.

A representative example of the non-volatile memory may be a flash memory. Flash memory may be widely used as a storage medium for audio and/or video data in information devices such as, but not limited to, personal computers (PCs) (e.g., laptops, tablets, or the like), mobile devices (e.g., smartphones, personal digital assistants (PDAs), telephone computing devices), smart devices (e.g., voice-controlled virtual assistants, set-top boxes (STBs), refrigerators, air conditioners, microwaves, televisions (TVs)), wearable devices (e.g., smart watch, headset, headphones), Internet-of-Things (IoT) devices, or any other type of data processing device. Recently, high-capacity, high-speed input/output (I/O), and low-power technologies for flash memories may be actively researched for installation in mobile devices such as, but not limited to, smartphones.

A memory device using a flash memory may include memory blocks. In order to use the memory blocks efficiently, the memory device may divide the memory blocks into multiple groups and manage the multiple groups as sub-blocks.

SUMMARY

One or more example embodiments of the present disclosure provide a memory device for managing sub-blocks which optimize user patterns, requirements, and constraints by using sub-blocks with different characteristics in combination.

According to an aspect of the present disclosure, a sub-block-based storage device includes a memory device configured to include a plurality of memory blocks, a work memory storing instructions, and a memory controller communicatively coupled with the memory device and the work memory and configured to manage the plurality of memory blocks. Each block of the plurality of memory blocks includes a plurality of sub-blocks having different capacities. The memory controller is configured to execute the instructions to manage used sub-blocks which store valid data from among the plurality of sub-blocks, manage free sub-blocks which are empty from among the plurality of sub-blocks, select a garbage collection source block from the used sub-blocks, select candidate destination blocks by comparing a size of valid data stored in the garbage collection source block and each of sizes of the free sub-blocks, and select a garbage collection destination block from the candidate destination blocks.

According to an aspect of the present disclosure, a sub-block-based memory management method includes selecting a garbage collection source block from among used sub-blocks storing valid data, selecting candidate destination blocks from free sub-blocks based on a size of the valid data stored in the garbage collection source block, and selecting a garbage collection destination block from among the candidate destination blocks. The used sub-blocks being divided into used sub-block groups based on a size of each of the used sub-blocks.

According to an aspect of the present disclosure, a sub-block-based storage device includes a memory device configured to include a plurality of memory blocks, a work memory storing instructions, and a memory controller communicatively coupled with the memory device and the work memory and configured to manage the plurality of memory blocks. Each block of the plurality of memory blocks includes a plurality of sub-blocks having different capacities. The memory controller is configured to execute instructions to manage a used sub-block pool including used sub-block groups, manage a free sub-block pool including free sub-block groups, select a garbage collection source block from the used sub-blocks, select candidate destination blocks from the free sub-blocks, and select a garbage collection destination block from the candidate destination blocks. Each of the used sub-block groups including used sub-blocks storing valid data. Each of the free sub-block groups storing free sub-blocks that are empty.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 2 is a block diagram illustrating an example embodiment of a memory device illustrated in FIG. 1;

FIG. 3 is a circuit diagram illustrating an example embodiment of a memory block BLK1 of a memory cell array illustrated in FIG. 2;

FIG. 5 is a block diagram illustrating a memory controller of FIG. 1, according to an example embodiment;

DETAILED DESCRIPTION

Figure 1:
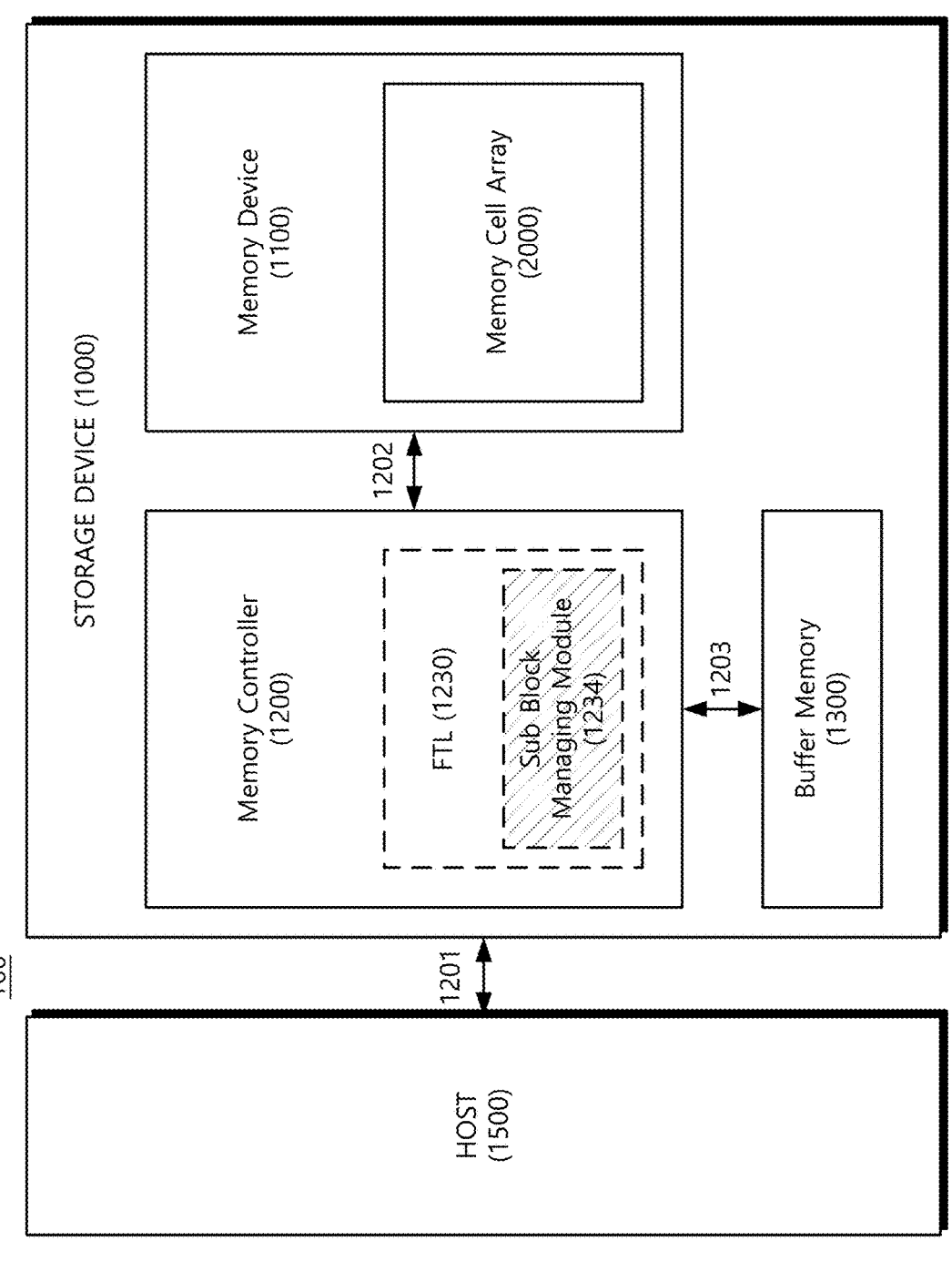
FIG. 1 is a block diagram illustrating a user device, according to an example embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein may be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it may be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The terms "upper," "middle", "lower", and the like may be replaced with terms, such as "first," "second," third" to be used to describe relative positions of elements. The terms "first," "second," third" may be used to describe various elements but the elements are not limited by the terms and a "first element" may be referred to as a "second element". Alternatively or additionally, the terms "first", "second", "third", and the like may be used to distinguish components from each other and do not limit the present disclosure. For example, the terms "first", "second", "third", and the like may not necessarily involve an order or a numerical meaning of any form.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, controller, control unit, memory controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

Hereinafter, various embodiments of the present disclosure are described with reference to the accompanying drawings.

FIG. 1 is a block diagram illustrating a user device, according to an example embodiment. Referring to FIG. 1, a user device 100 may include a storage device 1000 and a host 1500. The storage device 1000 and the host 1500 may be connected through a host interface 1201. The host interface 1201 may be a standard interface such as, but not limited to, advanced technology attachment (ATA), serial ATA (SATA), parallel ATA (PATA), universal serial bus (USB), small computer system interface (SCSI), enhanced small device interface (ESDI), Institute of Electrical and Electronics Engineers (IEEE) 1394 (FireWire), integrated drive electronics (IDE), a card interface, or the like.

According to an example embodiment, the storage device 1000 may be and/or may include a storage device based on a non-volatile memory. For example, the storage device 1000 may include a memory device 1100, a memory controller 1200, and a buffer memory 1300. The memory device 1100 may be and/or may include a non-volatile memory such as, but not limited to, a flash memory, a phase change random access memory (PRAM), or the like. When the memory device 1100 is a flash memory, the storage device 1000 may be referred to as a flash storage device based on the flash memory. For example, the storage device 1000 may be and/or may include, but not be limited to, a solid-state drive (SSD), universal flash storage (UFS), a memory card, or the like. In an embodiment, the buffer memory 1300 may be and/or may include a volatile memory (e.g., dynamic random access memory (DRAM)).

According to an example embodiment, the memory device 1100 may be connected to the memory controller 1200 through a memory interface 1202. The memory device 1100 may include a memory cell array 2000 and a peripheral circuit. The peripheral circuitry may include all analog or digital circuits that may be needed to store and/or read data in the memory cell array 2000.

According to an example embodiment, the peripheral circuit may receive external power from the memory controller 1200 and generate various levels of internal power. The peripheral circuit may receive commands, addresses, and data from the memory controller 1200, and store the data in the memory cell array 2000, according to the control signals. Additionally or alternatively, the peripheral circuit may read data stored in the memory cell array 2000 and provide the data to the memory controller 1200.

According to an example embodiment, the memory cell array 2000 may include a plurality of memory blocks. Each memory block may have a vertical three-dimensional (3D) structure. Each memory block may include a plurality of memory cells. Multi-bit data may be stored in each memory cell. For example, the memory device 1100 may be and/or may include a triple-level cell (TLC) flash memory capable of storing three (3) bits of data in one (1) memory cell.

According to an example embodiment, the memory cell array 2000 may be located next to or above the peripheral circuit due to a design arrangement structure. The structure in which the memory cell array 2000 is located above the peripheral circuit may be referred to as a cell on peripheral (COP) structure. The memory cell array 2000 may be manufactured as a separate chip from the peripheral circuit. The upper chip including the memory cell array 2000 and the lower chip including the peripheral circuit may be connected to each other using a bonding method. Such a structure may be referred to as a chip-to-chip (C2C) structure.

According to an example embodiment, the memory controller 1200 may be connected between the memory device 1100 and the host 1500. Additionally or alternatively, the memory controller 1200 may be connected between the buffer memory 1300 and the host 1500. The memory controller 1200 may control read and/or write operations of the memory device 1100 and/or the buffer memory 1300 in response to a request from the host 1500. The memory controller 1200 may receive host data from the host 1500 and provide the host data to the memory device 1100 and/or the buffer memory 1300.

According to an example embodiment, the memory controller 1200 may include a control unit and a work memory. The control unit may control overall operations of the memory controller 1200. For example, the control unit may control a flash translation layer (FTL) 1230 to perform an address mapping operation. The control unit may be and/or may include a commercially available or custom microprocessor.

According to an example embodiment, the work memory may be and/or may include a cache memory (e.g., a static random access memory (SRAM)). The work memory may serve as a buffer memory that may temporarily store data. Additionally or alternatively, the work memory may be a driving memory of the memory controller 1200. For example, the work memory may drive the FTL 1230.

According to an example embodiment, the FTL 1230 may be and/or may include a firmware and/or a program for efficiently managing the memory device 1100. The memory device 1100 may not support an overwrite function that may typically be provided by a hard disk drive (HDD) device. Consequently, the memory device 1100 may perform the following process while updating data written to the page. The memory device 1100 may copy all valid data in the first memory block to which the written page belongs to an empty second memory block. Subsequently, the memory device 1100 may erase the first memory block and mark the first memory block as an empty memory block. The memory device 1100 may perform a large number of page copy operations (e.g., a page read operation and/or a page write operation) and erase operations while going through this process.

According to an example embodiment, the FTL 1230 may be used between the host 1500 and the memory device 1100 to potentially reduce the number of page copy and erase operations. The FTL 1230 may perform an address mapping function, a garbage collection function, a wear-leveling function, or the like. When an overwrite request is received from the host 1500, the address mapping function may write the corresponding data to another empty page instead of overwriting the original page, thereby potentially reducing additional page copy and block erase operations. For this purpose, an address mapping table having a specified size may need to be maintained in the work memory and the buffer memory 1300. In an embodiment, the FTL 1230 may manage an operation of mapping a logical address received from the host 1500 to a physical address or a virtual address in the memory device 1100.

According to an example embodiment, the FTL 1230 may include a sub-block managing module 1234. The sub-block managing module 1234 may manage a plurality of memory blocks included in the memory cell array 2000 of the memory device 1100 as a plurality of super blocks. The sub-block managing module 1234 may match the plurality of memory blocks to each of the plurality of super blocks. The sub-block managing module 1234 may manage an address mapping table corresponding to the plurality of super blocks.

According to an example embodiment, the buffer memory 1300 may be connected to the memory controller 1200 through a buffer interface 1203. For example, the buffer memory 1300 may be used to temporarily store data to be stored in and/or read from the memory device 1100. Additionally or alternatively, a cache area capable of storing cache data may be allocated to the buffer memory 1300. The buffer memory 1300 may be implemented with a DRAM, an SRAM, or the like. The buffer memory 1300 may be included in the memory device 1100 and/or the memory controller 1200.

According to an example embodiment, the host 1500 may include a processor and a host memory. The processor and the host memory may be connected via an address/data bus. The host 1500 may be a personal digital assistance (PDA), a computer, a digital audio player, a digital camera, a mobile phone, or the like. The host memory may be and/or may include a non-volatile or volatile memory in the form of a cache, a read-only memory (ROM), a programmable ROM (PROM), an erasable PROM (EPROM), an electrically erasable PROM (EEPROM), a flash, a SRAM, a DRAM, or the like.

According to an example embodiment, the host memory may drive a plurality of software and/or firmware. For example, the host memory may drive an operating system (OS), applications, a file system, a memory manager, and input/output drivers, or the like.

The number and arrangement of components of the user device 100 shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may be integrated with each other, and/or may be implemented as an integrated circuit, as software, and/or a combination of circuits and software.

Figure 2:
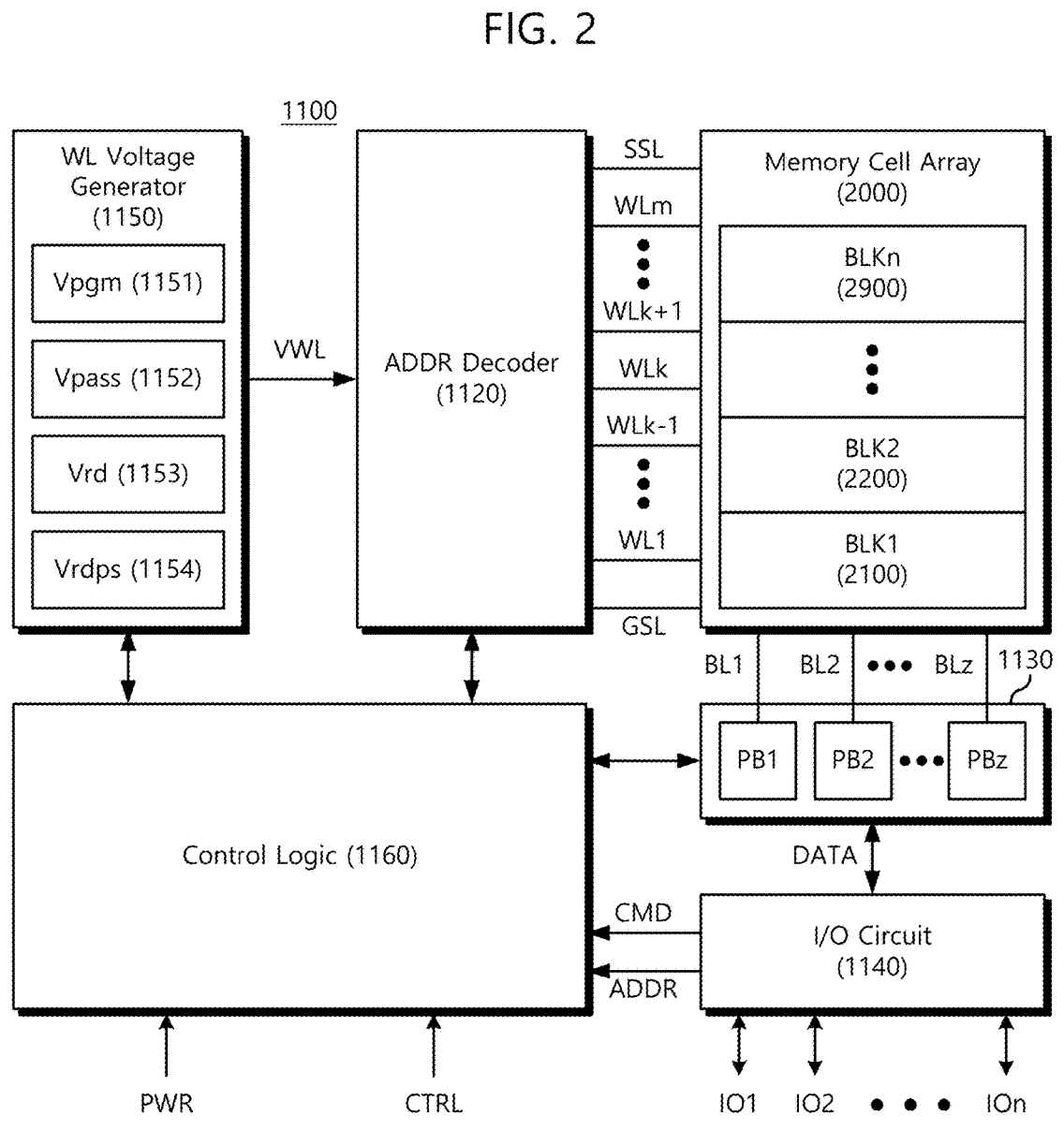

FIG. 2 is a block diagram illustrating as an example embodiment of a memory device illustrated in FIG. 1. The storage device 1000 of FIG. 1 may be a flash storage device based on flash memory. For example, the storage device 1000 may be implemented as an SSD, UFS and/or memory card, or the like.

Referring to FIGS. 1 and 2, the memory device 1100 may include a memory cell array 2000 and a peripheral circuit. The peripheral circuit may include an address (ADDR) decoder 1120, a page buffer circuit 1130, an input/output (I/O) circuit 1140, a word line voltage generator 1150, and/or control logic 1160.

According to an example embodiment, the memory cell array 2000 may include a plurality of memory blocks (e.g., a first memory block BLK1 2100, a second memory block BLK2 2200, to an n-th memory block BLKn 2900, where n is a positive integer greater than zero (0)). Each memory block of the plurality of memory blocks 2100 to 2900 may be configured as a plurality of pages. Each page may include a plurality of memory cells. Each memory cell may store multi-bit data (e.g., two (2) or more bits). Each memory block may correspond to an erase unit, and each page may correspond to a read and/or write unit.

According to an example embodiment, the memory cell array 2000 may be formed in a direction perpendicular to a substrate. A gate electrode layer and an insulation layer may be alternately deposited on the substrate. Each memory block of the plurality of memory blocks 2100 to 2900 may be connected to one or more string selection lines SSL, a plurality of word lines (e.g., a first word line WL1, to a (k−1)-th word line WLk−1, a k-th word line WLk, a (k+1)-th word line WLk+1, to an m-th word line WLm, where k and m are positive integers greater than zero (0), and m is greater than k), and one or more ground selection lines GSL. The k-th word line WLk may be a selected word line and the remaining word lines (e.g., the first word line WL1 to the (k−1)-th word line WLk−1 and the (k+1)-th word line WLk+1 to the m-th word line WLm) may be unselected word lines.

According to an example embodiment, the address decoder 1120 may be connected to the memory cell array 2000 through selection lines SSL and GSL and first to m-th word lines WL1 to WLm. The address decoder 1120 may select a word line during a program and/or a read operation. The address decoder 1120 may receive the word line voltage VWL from the word line voltage generator 1150 and provide a program voltage and/or read voltage to the selected word line.

According to an example embodiment, the page buffer circuit 1130 may be connected to the memory cell array 2000 through bit lines (e.g., a first bit line BL1, a second bit line BL2, to a z-th bit line BLz, where z is a positive integer greater than zero (0)). The page buffer circuit 1130 may temporarily store data to be stored in the memory cell array 2000 and/or data read from the memory cell array 2000. The page buffer circuit 1130 may include page buffers (e.g., a first page buffer PB1, a second page buffer PB2, to a z-th page buffer PBz) connected to respective bit lines (e.g., the first to z-th bit lines BL1 to BLz). Each page buffer of the first to z-th page buffers PB1 to PBz may include a plurality of latches to store and/or read multi-bit data.

According to an example embodiment, the input/output circuit 1140 may be internally connected to the page buffer circuit 1130 through data lines DATA and externally connected to the memory controller (e.g., memory controller 1200 of FIG. 1) through the input/output lines (e.g., a first input/output line 101, a second input/output line 102, to an n-th input/output line IOn). The input/output circuit 1140 may receive program data from the memory controller 1200 during a program operation. Alternatively or additionally, the input/output circuit 1140 may provide data read from the memory cell array 2000 to the memory controller 1200 during a read operation.

According to an example embodiment, the word line voltage generator 1150 may receive internal power from the control logic 1160 and generate a word line voltage VWL required to read or write data. The word line voltage VWL may be provided to a selected word line sWL (e.g., the k-th word line WLk) or unselected word lines uWL (e.g., the first word line WL1 to the (k−1)-th word line WLk−1 and the (k+1)-th word line WLk+1 to the m-th word line WLm) through the address decoder 1120.

According to an example embodiment, the word line voltage generator 1150 may include a program voltage generator 1151 and a pass voltage generator 1152. The program voltage generator 1151 may generate a program voltage Vpgm provided to the selected word line sWL during a program operation. The pass voltage generator 1152 may generate a pass voltage Vpass provided to the selected word line sWL and the unselected word lines uWL.

According to an example embodiment, the word line voltage generator 1150 may include a read voltage generator 1153 and a read pass voltage generator 1154. The read voltage generator 1153 may generate a select read voltage Vrd provided to the select word line sWL during a read operation. The read pass voltage generator 1154 may generate a read pass voltage Vrdps provided to unselected word lines uWL. The read pass voltage Vrdps may be a voltage sufficient to turn on memory cells connected to the unselected word lines uWL during a read operation.

According to an example embodiment, the control logic 1160 may control operations such as, but not limited to, read, write, and erase of the memory device 1100 using commands CMD, addresses ADDR, and/or control signals CTRL provided from the memory controller 1200. The addresses ADDR may include a block selection address for selecting one memory block, a row address for selecting one page, and/or a column address for selecting one memory cell.

The number and arrangement of components of the memory device 1100 shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Alternatively or additionally, a set of (one or more) components shown in FIG. 2 may be integrated with each other, and/or may be implemented as an integrated circuit, as software, and/or a combination of circuits and software.

Figure 3:
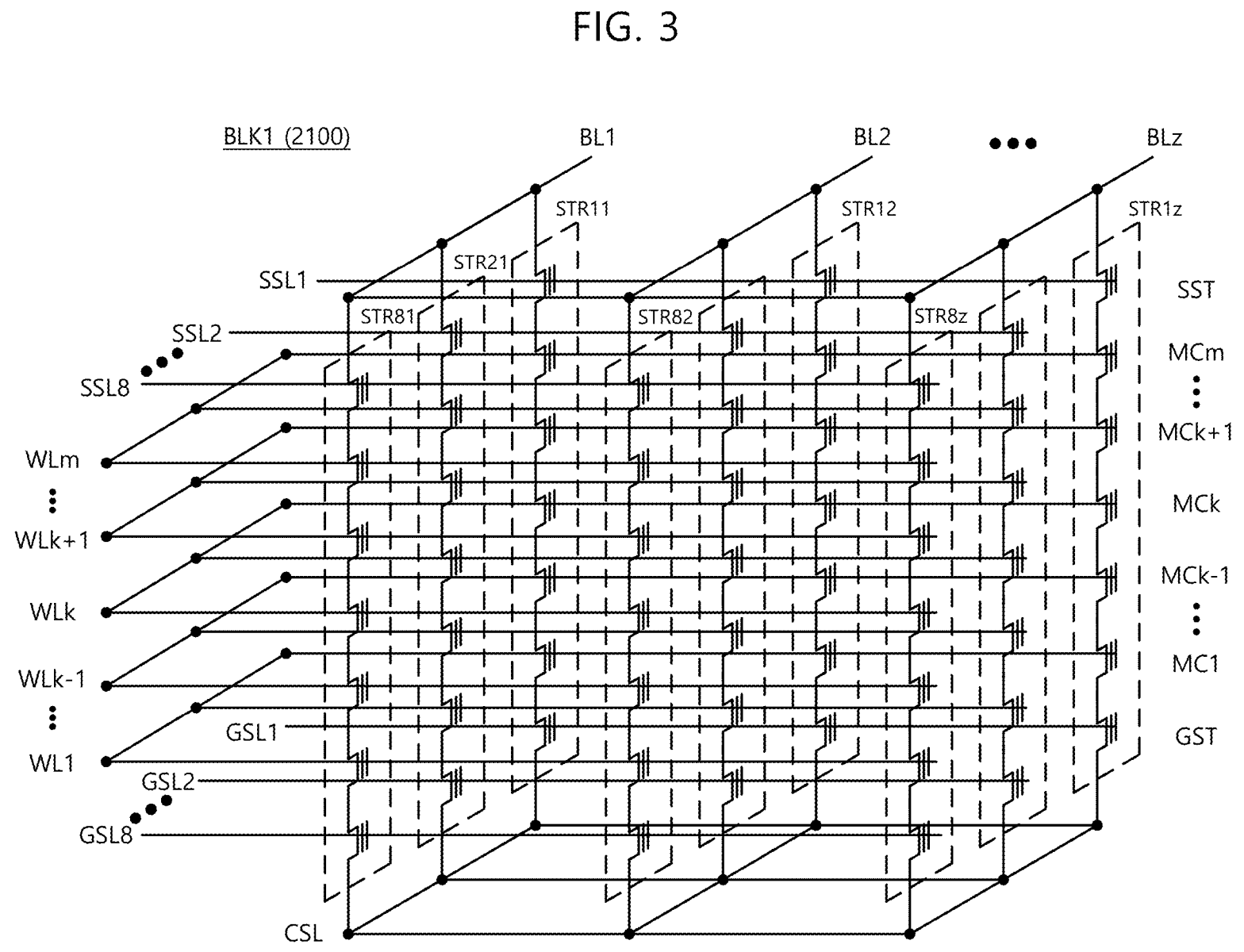

FIG. 3 is a circuit diagram illustrating an example embodiment of a memory block BLK1 2100 of a memory cell array illustrated in FIG. 2. Referring to FIG. 3, in the memory block BLK1 2100, a plurality of cell strings (e.g., a first cell string STR11, a second cell string STR12, to a z-th cell string STR1z, a (z+1)-th cell string STR21, a (z+2)-th cell string STR22, to a (2z)-th cell string STR2z, to a (7z+1)-th cell string STR81, a (7z+2)-th cell string STR82, to a (8z)-th cell string STR8z, hereinafter generally referred to as "STR") may be formed between the first to z-th bit lines BL1 to BLz and a common source line CSL. Each cell string of the plurality of cell strings STR may include a string selection transistor SST, a plurality of memory cells (e.g., a first memory cell MC1, to a (k−1)-th memory cell MCk−1, a k-th memory cell MCk, a (k+1)-th memory cell MCk+1, to an m-th memory cell MCm, hereinafter generally referred to as "MC") and/or a ground selection transistor GST.

According to an example embodiment, the string selection transistors SST may be connected with string selection lines (e.g., a first string selection line SSL1, a second string selection line SSL2, to an eighth string selection line SSL8). The ground selection transistors GST may be connected with ground selection lines (e.g., a first ground selection line GSL1, a ground selection line GSL2, to an eighth ground selection line GSL8). The string selection transistors SST may be connected with the first to z-th bit lines BL1 to BLz, and the ground selection transistors GST may be connected with the common source line CSL.

According to an example embodiment, the first to m-th word lines WL1 to WLm may be connected with the plurality of memory cells MC1 to MCm in a row direction. The first to z-th bit lines BL1 to BLz may be connected with the plurality of memory cells MC1 to MCm in a column direction.

According to an example embodiment, the first word line WL1 may be placed above the first to eighth ground selection lines GSL1 to GSL8. The first memory cells MC1 that are placed at the same height from the substrate may be connected with the first word line WL1. The m-th word line WLm may be placed below the first to eighth string selection lines SSL1 to SSL8. The m-th memory cells MCm that are placed at the same height from the substrate may be connected with the m-th word line WLm. In a similar manner, the second to m−1 memory cells MC2 to MCm−1 that are placed at the same heights from the substrate may be respectively connected with the second to m−1 word lines WL2 to WLm−1.

Figure 4:
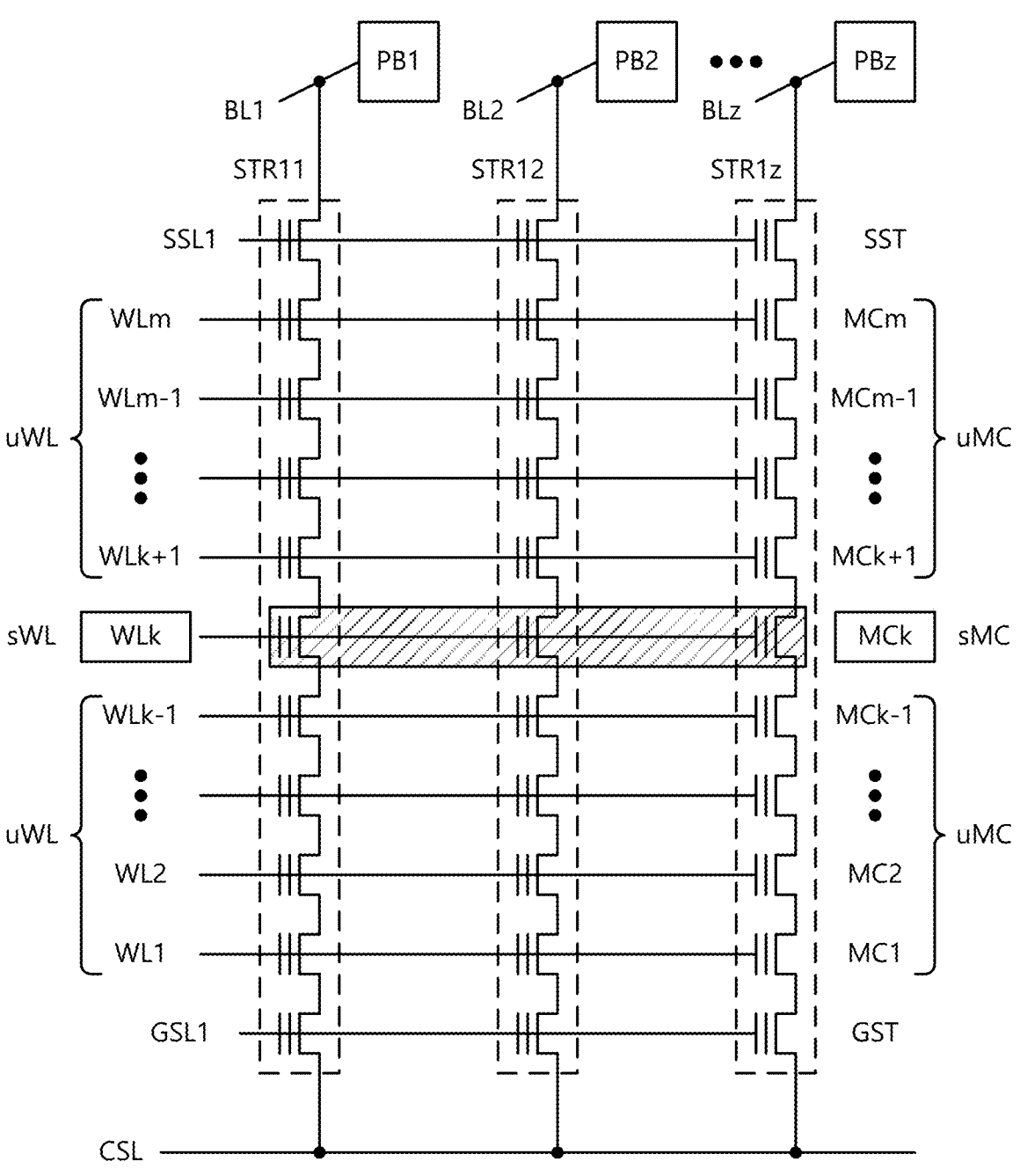
FIG. 4 is a circuit diagram illustrating cell strings selected by a first string selection line SSL1 among cell strings of a memory block BLK1 illustrated in FIG. 3, according to an example embodiment.

FIG. 4 is a circuit diagram illustrating cell strings selected by a first string selection line SSL1 among cell strings of a memory block BLK1 illustrated in FIG. 3, according to an example embodiment. One-one to one-z cell strings STR11 to STR1z may be selected by the first string selection line SSL1. The first to z-th cell strings STR11 to STR1z may be connected to first to z-th bit lines BL1 to BLz, respectively. First to z-th page buffers PB1 to PBz may be connected to the first to z-th bit lines BL1 to BLz, respectively.

According to an example embodiment, the first cell string STR11 may be connected to the first bit line BL1 and the common source line CSL. The first cell string STR11 may include string selection transistors SST selected by the first string selection line SSL1, first to m-th memory cells MC1 to MCm connected to first to m-th word lines WL1 to WLm, and ground selection transistors GST selected by first ground selection line GSL1. The second cell string STR12 may be connected to the second bit line BL2 and the common source line CSL. The z-th cell string STR1z may be connected to the z-th bit line BLz and the common source line CSL.

According to an example embodiment, the first word line WL1 and the m-th word line WLm may be referred to as edge word lines edge WL. The second word line WL2 and the m−1 word line WLm−1 may be referred to as edge adjacent word lines edge adjacent WL. The k-th word line WLk may be referred to as a selection word line sWL. The k−1 word line WLk−1 and the k+1 word line WLk+1 may be referred to as adjacent word lines located next to the selected word line sWL. When the k-th word line WLk is a selected word line sWL, the remaining word lines WL1 to WLk−1 and WLk+1 to WLm may be referred to as unselected word lines uWL.

According to an example embodiment, the first memory cells MC1 and the m-th memory cells MCm may be referred to as edge memory cells. The second memory cells MC2 and the m−1 memory cells MCm−1 may be referred to as edge adjacent memory cells. The k-th memory cells MCk may be referred to as selection memory cells sMC. The k−1 memory cells MCk−1 and the k+1 memory cells MCk+1 may be referred to as memory cells adjacent to the selected memory cells (hereinafter referred to as adjacent memory cells (adjacent MC)). When the k-th memory cells MCk are selected memory cells sMC, the remaining memory cells MC1 to MCk−1 and MCk+1 to MCm may be referred to as unselected memory cells uMC.

According to an example embodiment, a set of memory cells selected by one string selection line and connected to one word line may be referred to as one page. For example, memory cells selected by the first string selection line SSL1 and connected to the k-th word line WLk may constitute one page. As another example, eight (8) pages may be configured in the k-th word line WLk. Among the eight (8) pages, a page connected to the first string selection line SSL1 may be referred to as a selected page, and the other pages connected to the second to eighth string selection lines SSL2 to SSL8 may be referred to as unselected pages.

Figure 5:
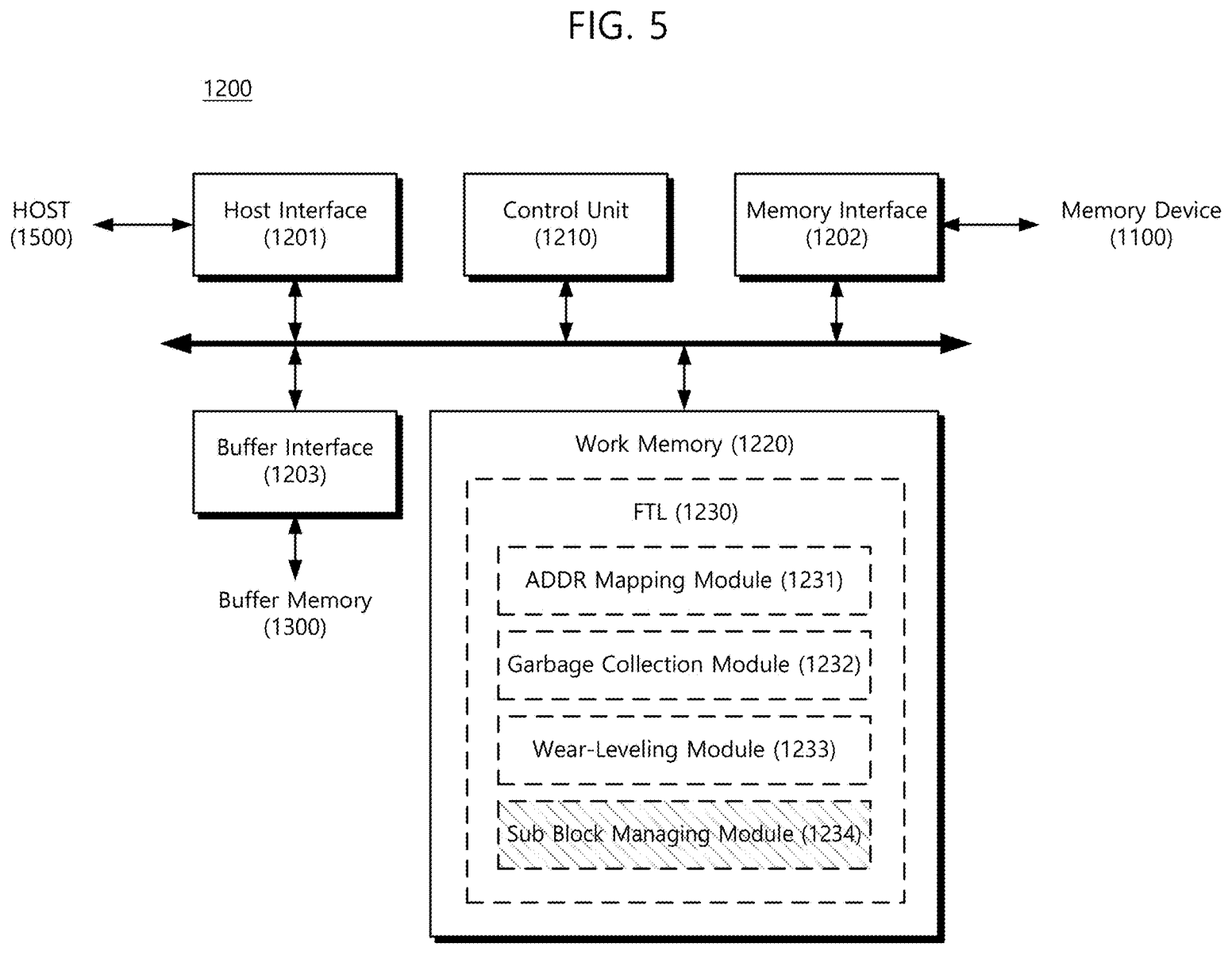

FIG. 5 is a block diagram illustrating a memory controller of FIG. 1, according to an example embodiment. Referring to FIG. 5, the memory controller 1200 may include a host interface 1201, a memory interface 1202, a buffer interface 1203, a control unit 1210 and/or a work memory 1220.

In an example embodiment, the memory controller 1200 may further include various other components. For example, the memory controller 1200 may further include an error correction code (ECC) circuit, a command generation module, or the like. The ECC circuit may generate an ECC to potentially correct fail bits and/or error bits of data received from the memory device 1100. The command generation module may generate a command CMD for controlling memory operations according to a request from the host 1500.

According to an example embodiment, the host interface 1201 may provide an interface between the host 1500 and the memory controller 1200. Standard interfaces include various interface methods such as, but not limited to, an ATA, a SATA, an external SATA (e-SATA), a SCSI, a serial attached SCSI (SAS), a peripheral component interconnection (PCI), a PCI express (PCI-E), a FireWire, an USB, a secure digital (SD) card, a multi-media card (MMC), an embedded MMC (eMMC), an UFS, a compact flash (CF) card interface, or the like.

According to an example embodiment, the memory interface 1202 may provide an interface between the memory device 1100 and the memory controller 1200. For example, write and/or read data may be transmitted to and/or received from the memory device 1100 through the memory interface 1202. The memory interface 1202 may provide commands and addresses to the memory device 1100. Additionally or alternatively, the memory interface 1202 may provide data read from the memory device 1100 to the memory controller 1200.

According to an example embodiment, the buffer interface 1203 may provide an interface between the buffer memory 1300 and the memory controller 1200. For example, data temporarily stored in the buffer memory 1300 may be transmitted to and/or received from the buffer memory 1300 through the buffer interface 1203.

According to an example embodiment, the control unit 1210 may include a central processing unit (CPU), a microprocessor, or the like, and may control the overall operation of the memory controller 1200. The control unit 1210 may drive firmware loaded in the work memory 1220 to control the memory controller 1200.

According to an example embodiment, the work memory 1220 may be implemented with various memories, for example, at least one of a cache memory, a DRAM, a SRAM, a PRAM and/or a flash memory. The work memory 1220 may drive a FTL 1230 under the control of the control unit 1210.

According to an example embodiment, the FTL 1230 may be and/or may include firmware and/or a program for efficiently managing the memory device 1100. In an embodiment, the memory device 1100 may not support an overwrite function that may be provided by a HDD. Therefore, to modify data written on a page, the memory device 1100 may need to copy all valid data (or valid pages) in a previous block to which the page belongs to another empty block and delete the previous block. This process may perform multiple page copy (read and write pages) and erase operations.

According to an example embodiment, the FTL 1230 may be used between the host 1500 and the memory device 1100 to potentially reduce the number of page copy and erase operations. The FTL 1230 may include an address mapping module 1231, a garbage collection module 1232 and/or a wear-leveling module 1233.

According to an example embodiment, the address mapping module 1231 may perform an address mapping operation on a page-by-page or block-by-block basis. The page address mapping operation may refer to an operation that converts a logical page address received from the file system into a physical page address within the memory device 1100. For this purpose, a page-level address mapping table may need to be maintained in the work memory 1220. The page address mapping operation may provide garbage collection performance but may need a large address mapping table.

According to an example embodiment, the garbage collection module 1232 may perform a garbage collection operation by referring to the address mapping table. For example, to secure one or more free blocks, the garbage collection module 1232 may use an address mapping table, record one or more valid data stored in a source block to a random block, and secure a free block by erasing the source block in which all the valid data have been moved.

According to an example embodiment, the wear-leveling module 1233 may manage wear-level of memory cells of the memory device 1100. Memory cells may be deteriorated by write and erase operations, or the like. Deteriorated memory cells may cause defects. The wear-leveling module 1233 may manage program and erase cycles for the memory cell array 2000 to potentially reduce and/or prevent specific cell areas from wearing out faster than other cell areas. The wear-leveling module 1233 may control the address mapping module 1231 such that program and erase times may be equally assigned to cell areas of the memory cell array 2000.

According to an example embodiment, the FTL 1230 may include a sub-block managing module 1234. For example, the sub-block managing module 1234 may manage a plurality of memory blocks included in the memory cell array 2000 as a plurality of sub-blocks. The sub-block managing module 1234 may match the plurality of memory blocks to each of the plurality of sub-blocks. The sub-block managing module 1234 may manage an address mapping table corresponding to the plurality of sub-blocks.

The number and arrangement of components of the memory controller shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Alternatively or additionally, a set of (one or more) components shown in FIG. 5 may be integrated with each other, and/or may be implemented as an integrated circuit, as software, and/or a combination of circuits and software.

Figure 6:
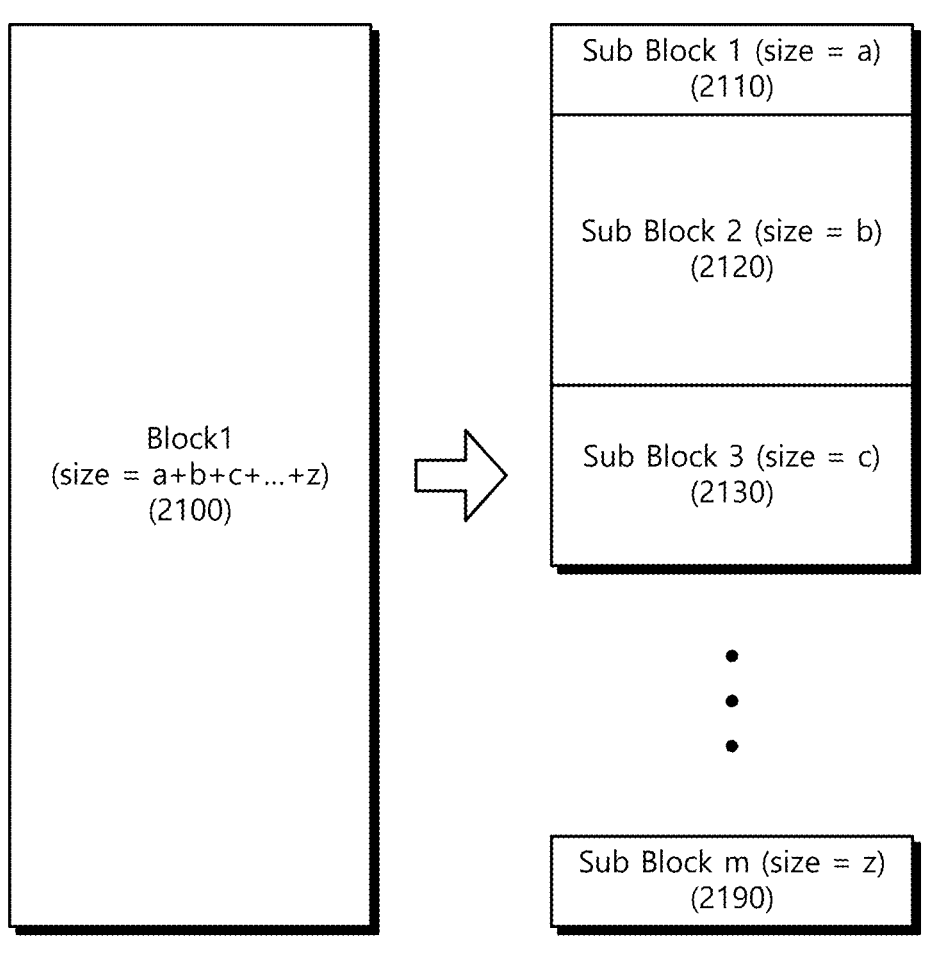
FIG. 6 is a diagram illustrating a relationship between a memory block and sub-blocks illustrated in FIG. 2, according to an example embodiment.

FIG. 6 is a diagram illustrating a relationship between a memory block and sub-blocks illustrated in FIG. 2, according to an example embodiment. Referring to FIGS. 5 and 6, the memory block 2100 may include at least one sub-block (e.g., a first sub block 2110, a second sub block 2120, a third sub block 2130, to m-th sub block 2190. The first to m-th sub-blocks 2110 to 2190 included in the memory block 2100 may be physically separated.

A sub-block may refer to the minimum unit on which an erase operation may be performed. For example, the memory block 2100 or the first to m-th sub-blocks 2110 to 2190 may be used as a data management unit for normal input/output operations such as, but not limited to, search operations, read operations, write operations, or the like.

For example, the memory device 1200 may perform an erase operation on a sub-block basis. However, the present disclosure is not limited in this regard, and depending on the embodiment, the erase operation may be performed on a memory block basis.

In an example embodiment, the plurality of sub-blocks 2110 to 2190 may have the same size. Alternatively, the plurality of sub-blocks 2110 to 2190 may have different sizes. For example, the plurality of sub-blocks 2110 to 2190 may have different sizes due to characteristics of a physical structure. In an embodiment, a sum of sizes of the first to m-th sub-blocks 2110 to 2190 may be equal to a size of the memory block 2100. For example, the size of the memory block 2100 may be equal to the sum of a to z when a size of the first sub-block 2110 is a, a size of the second sub-block 2120 is b, and sizes of the third sub-block 2130 to the m-th sub-block 2190 are c to z.

The sub-block managing module 1234 may manage the first to m-th sub-blocks 2110 to 2190. The sub-block managing module 1234 may access each of the first to m-th sub-blocks 2110 to 2190. The sub-block managing module 1234 may perform an input/output operation (I/O command) and erase for each of the first to m-th sub-blocks 2110 to 2190. The sub-block managing module 1234 may manage an erase count of each sub-block.

For example, each of the first to m-th sub-blocks 2110 to 2190 may have a smaller capacity than the memory block 2100. The sub-block managing module 1234 may quickly and efficiently manage data of a sub-block with a relatively small capacity.

Figure 7:
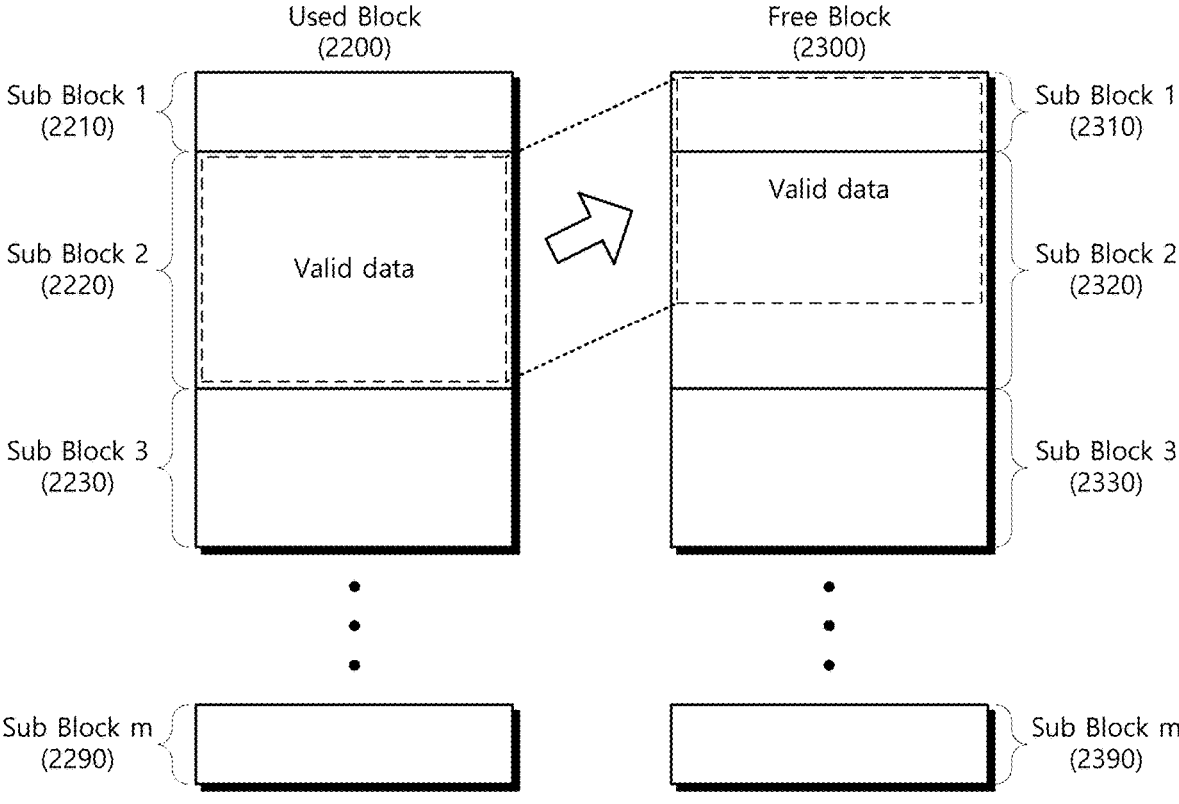
FIG. 7 is a diagram illustrating problems which occur when applying related garbage collection to sub-blocks, according to an example embodiment.

FIG. 7 is a diagram illustrating problems that may occur when applying related garbage collection to sub-blocks, according to an example embodiment. Problems may arise when data is moved without considering a size of a sub-block. Referring to FIG. 7, a used block 2200 may be a source block of a garbage collection, and a free block 2300 may be a destination block of the garbage collection. The used block 2200 may include a plurality of sub-blocks 2210 to 2290.

The used block 2200 may represent a memory block including a sub-block in which valid data is stored. For example, valid data may be stored in a second sub-block 2220 of the used block 2200.

The valid data of the second sub-block 2220, which may be the largest sub-block in the used block 2200, may be moved to the free block 2300. For example, the free block 2300 may represent a memory block with empty storage space. When data moves without considering sizes of sub-blocks included in the free block 2300, the data may be written sequentially from the beginning of the free block 2300. When the valid data size is larger than a first free sub-block 2310 to be moved, the valid data may exceed one free sub-block. Accordingly, the stored valid data may cross over a movement target free sub-block (e.g., the first free sub-block 2310) and a next free sub-block (e.g., a second free sub-block 2320). As a result of performing the garbage collection on one sub-block (the second sub-block 2220), a problem may occur in which two free sub-blocks (e.g., the first and second sub-blocks 2310 and 2320) are used.

Figure 8:
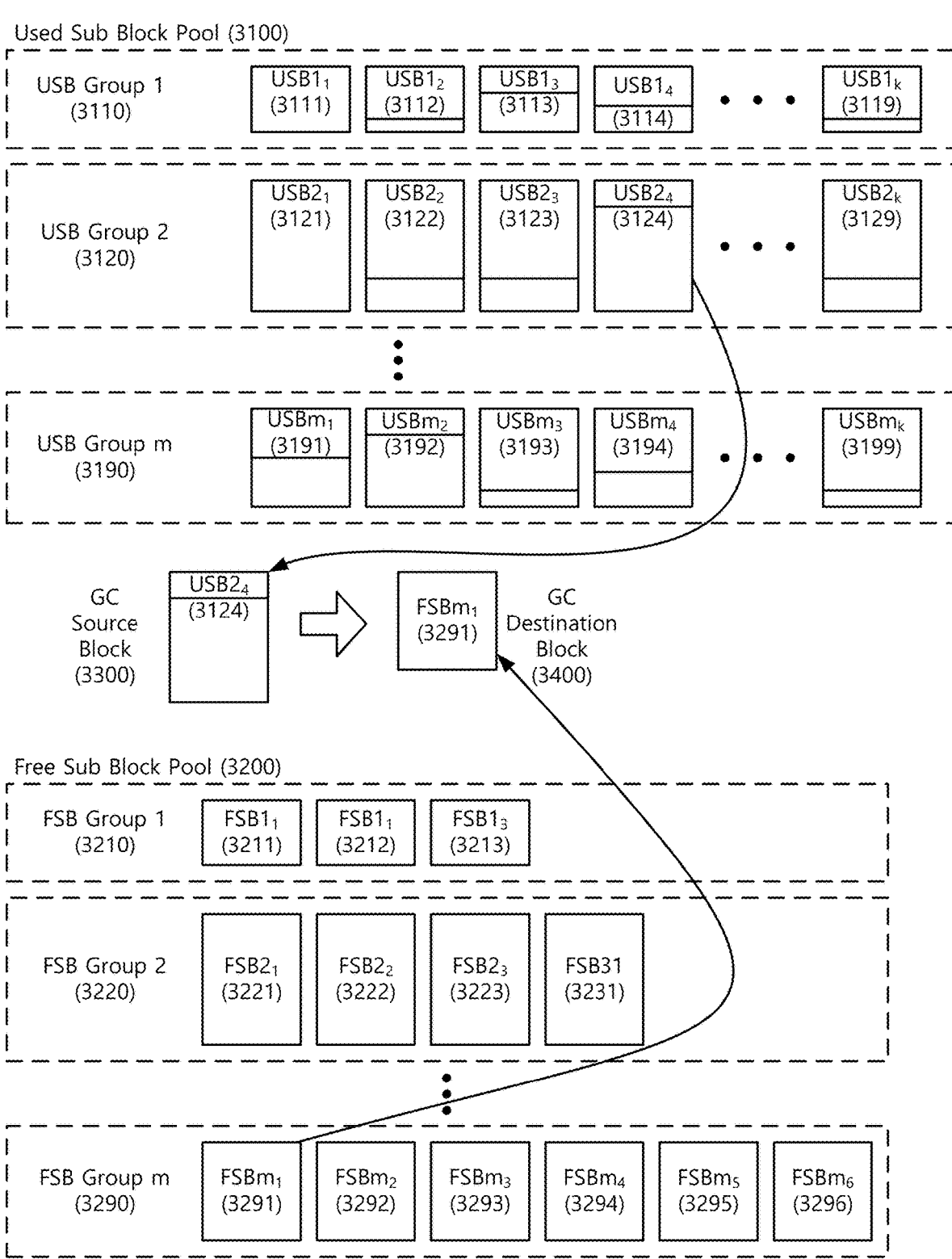
FIG. 8 is a diagram illustrating a garbage collection method of a memory device including sub-blocks, according to an example embodiment.

FIG. 8 is a diagram illustrating a garbage collection method of a memory device including sub-blocks, according to an example embodiment. Referring to FIGS. 5 and 8, the sub-block managing module 1234 may perform a garbage collection.

The sub-block managing module 1234 may select a source block 3300 for garbage collection (hereinafter referred to as a GC source block 3300) from a used sub-block pool 3100. For example, the used sub-block pool 3100 may include a plurality of used sub-block groups (e.g., a first used sub-block group 3110, a second used sub-block group 3120, to an m-th used sub-block group 3190). Each of the first to m-th used sub-block groups 3110 to 3190 may include at least one or more used sub-blocks 3111 to 3199. The used sub-blocks 3111 to 3199 may refer to sub-blocks in which valid data may be stored. With regard to how the sub-block managing module 1234 selects a fourth used sub-block 3124 in the second used sub-block group 3120 as the GC source block 3300, the following is described below with reference to FIG. 9.

The sub-block managing module 1234 may select a destination block 3400 for garbage collection (hereinafter referred to as a GC destination block 3400) from the free sub-block pool 3200. For example, the free sub-block pool 3200 may include a plurality of free sub-block groups (e.g., a first free sub-block group 3210, a second free sub-block group 3220, to an m-th free sub-block group 3290). Each of the first to m-th free sub-block groups 3210 to 3290 may include at least one or more free sub-blocks 3211 to 3296. The free sub-blocks 3211 to 3296 may refer to empty sub-blocks. With regard to how the sub-block managing module 1234 selects a first free sub-block 3291 from a m-th free sub-block group 3290 as the destination block 3400 for garbage collection, the following is described with reference to FIGS. 10 to 13.

The sub-block managing module 1234 may move data from the GC source block 3300 to the GC destination block 3400.

Additionally or alternatively, after moving the data, the sub-block managing module 1234 may erase the data in the GC source block 3300 and set an erase flag.

The sub-block managing module 1234 may move valid data (shaded portion in the figure) of the GC source block 3300 (e.g., the fourth used sub-block 3124 in the second used sub-block group 3120) to the GC destination block 3400 (e.g., the first free sub-block 3291 in the m-th free sub-block group 3290).

Figure 9:
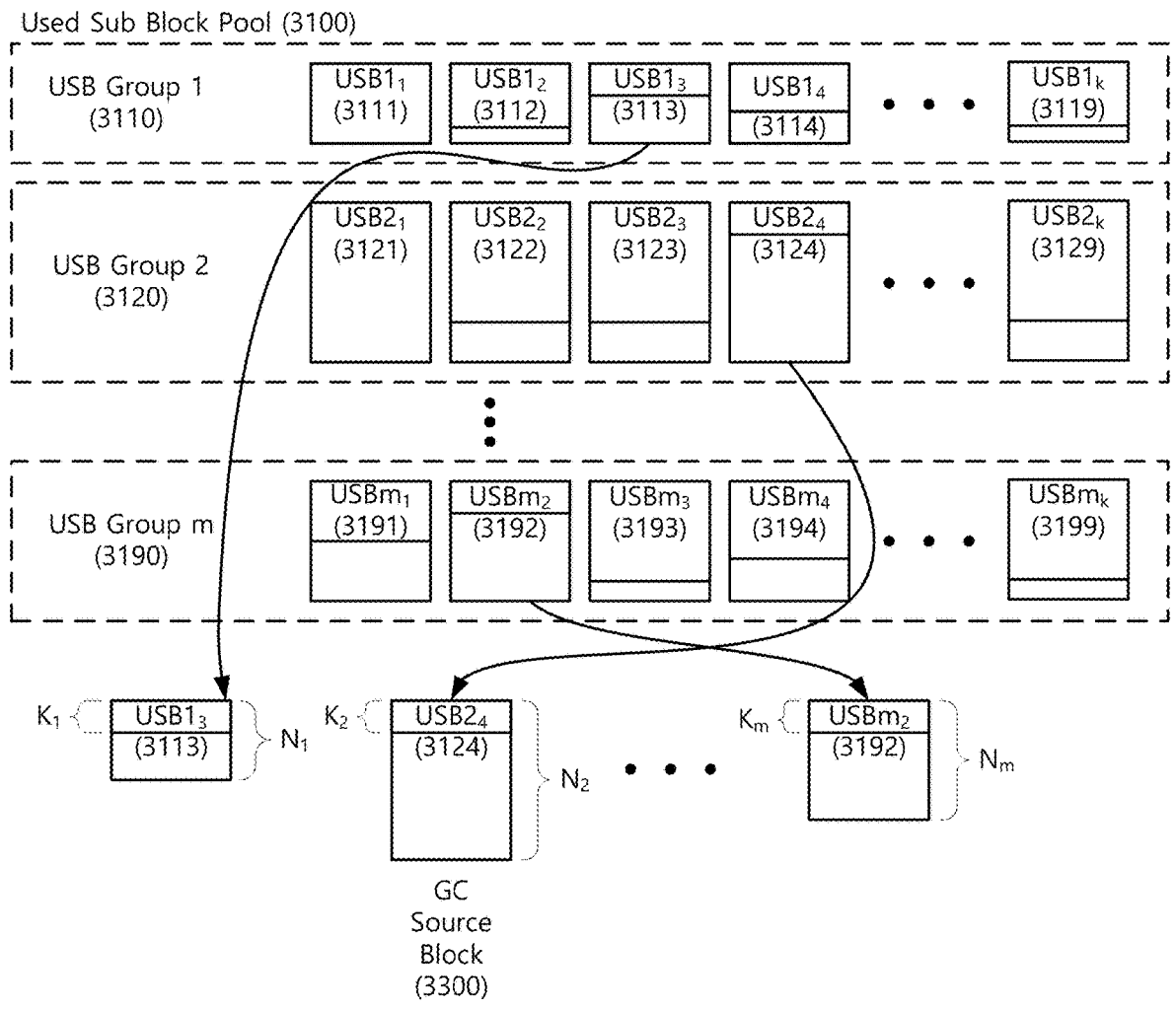
FIG. 9 is a diagram illustrating a method of selecting a source sub-block for a garbage collection, according to an example embodiment.

FIG. 9 is a diagram illustrating a method of selecting a source sub-block for a garbage collection, according to an example embodiment. Referring to FIGS. 5 and 9, the sub-block managing module 1234 may select a GC source block from the used sub-block pool 3100.

The sub-block managing module 1234 may manage the used sub-block pool 3100. For example, the used sub-block pool 3100 may include a plurality of used sub-block groups 3110 to 3190. Each of the used sub-block groups 3110 to 3190 may include at least one or more used sub-blocks 3111 to 3199. The sub-block managing module 1234 may manage a valid page count (VPC) of the used sub-blocks 3111 to 3199. That is, the VPC may represent valid data on a page basis. Additionally or alternatively, the VPC may refer to the total number of valid pages within one used USB.

The sub-block managing module 1234 may search for used sub-blocks 3113, 3124 and 3192 with the smallest VPC in each of the used sub-block groups 3110 to 3190 of the used sub-block pool 3100. The sub-block managing module 1234 may search for the third used sub-block 3113 in the first used sub-block group 3110. The sub-block managing module 1234 may search for the fourth used sub-block 3124 in the second used sub-block group 3120. Additionally or alternatively, the sub-block managing module 1234 may search for the second used sub-block 3192 in the m-th used sub-block group 3190. The sub-block managing module 1234 may find three (3) used sub-blocks 3113, 3124 and 3192. However, the present disclosure is not limited in this regard, and the sub-block managing module 1234 may find more (e.g., greater than or equal to four (4)) used sub-blocks or may less (e.g., less than or equal to two (2)) used sub-blocks.

The sub-block managing module 1234 may calculate a weighted valid page count (hereinafter referred to as W-VPC) for the discovered used sub-blocks 3113, 3124 and 3192.

The sub-block managing module 1234 may calculate the W-VPC according to an equation similar to Equation 1. For example, attributes of a used sub-block may include a valid data size and a size of the used sub-block.

$$\text{Weighted } VPC = K \times \frac{1}{N} \qquad \text{[Equation 1]}$$

Referring to Equation 1, the Weighted VPC may represent the weighted valid page count, K may represent a size of the valid data (VPC), and N may represent a size of the used sub-blocks.

According to Equation 1, the W-VPC may become smaller as the valid data decreases. Additionally, the W-VPC may decrease as the size of the used sub-blocks USB increases. Small valid data and a large used sub-block may indicate that there are many unused pages (invalid pages) in the used sub-block.

For example, when a first valid data size K1 is two (2) and a first sub-block size N1 is five (5) in a used sub-block 3113, a first W-VPC may be equal 0.4. As another example, when a second valid data size K2 is two (2) and a second sub-block size N2 is ten (10) in a used sub-block 3124, a second W-VPC may be 0.2. As another example, when an m-th valid data size Km is two (2) and an m-th sub-block size Nm is eight (8) in a used sub-block 3192, an m-th W-VPC may be equal to 0.25.

The sub-block managing module 1234 may compare the W-VPCs of the used sub-blocks 3113, 3124 and 3192. The sub-block managing module 1234 may search for a sub-block with the smallest W-VPC (e.g., the second W-VPC) as a result of the comparison. The sub-block managing module 1234 may select a searched sub-block (e.g., the used sub-block 3124) as a GC source block.

For example, the first W-VPC of the used sub-block 3113 may be equal to 0.4, the second W-VPC of the used sub-block 3124 may be equal to 0.2, and the third W-VPC of the used sub-block 3192 may be equal to 0.25. The sub-block managing module 1234 may select the second W-VPC of the used sub-block 3124, which is the smallest among the W-VPCs. Accordingly, the sub-block managing module 1234 may select the fourth used sub-block 3124 of the second used sub-block group 3120 as a GC source block.

The sub-block managing module 1234 may calculate the W-VPC according to an equation similar to Equation 2. For example, attributes of the used sub-block USB may include a valid data size, a size of the used sub-block, and an attribute weight of the used sub-block.

$$\text{Weighted } VPC = K \times \frac{1}{N} \times \alpha \qquad \text{[Equation 2]}$$

Referring to Equation 2, the Weighted VPC may represent the weighted valid page count, K may represent a size of the valid data (VPC), N may represent a size of the used sub-blocks, and a may represent an attribute weight of the used sub-blocks.

For example, the attributes of the used sub-block may include an erase count. When the erase count is large, the sub-block managing module 1234 may increase the attribute weight a of the used sub-block. When the attribute weight a of the used sub-block increases, the W-VPC may also increase, thus a possibility that the used sub-block is selected may decrease. Therefore, a reuse count of the used sub-block may be maintained.

When a valid data size K is the same with a sub-block size N and an erase count a as an attribute weight is small, the sub-block managing module 1234 may select a used sub-block with a small attribute weight a as the GC source block 3300.

Figure 10:
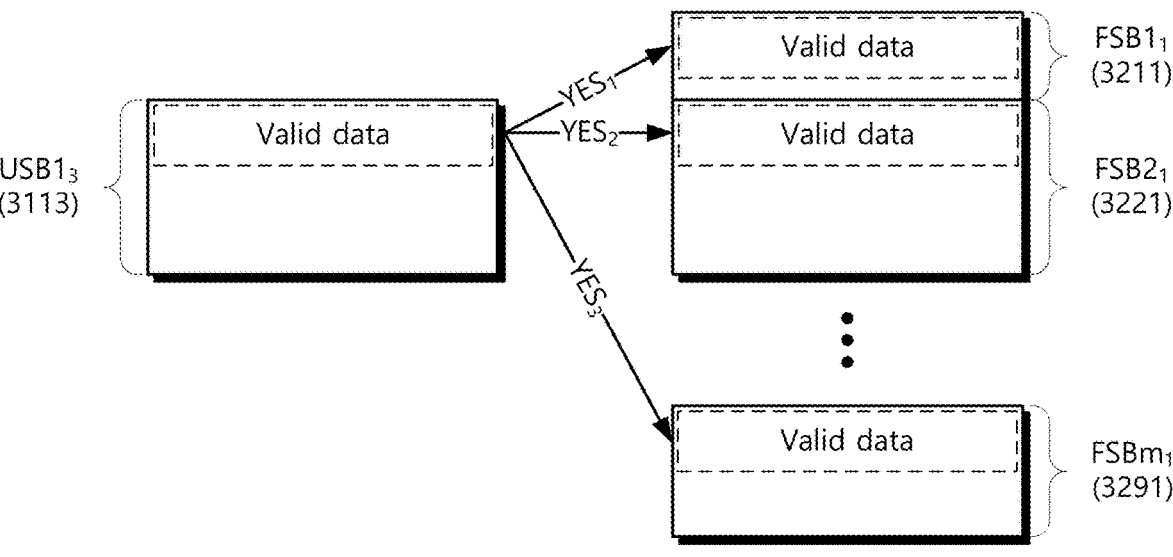
FIG. 10 is a diagram illustrating a process for selecting a candidate destination block when a valid data size is small, according to an example embodiment.
Figure 11:
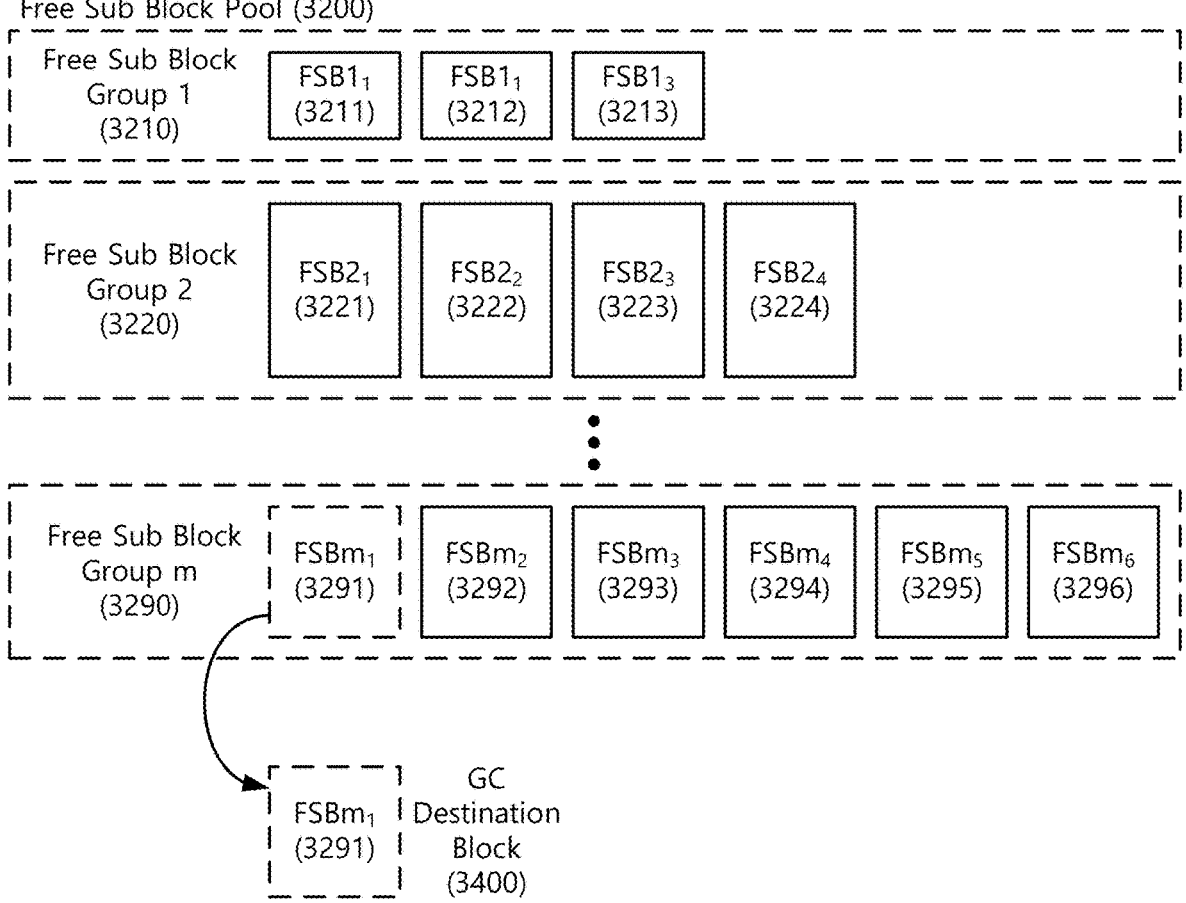
FIG. 11 is a diagram illustrating a process of selecting a destination block for a garbage collection from a candidate destination block when a valid data size is small, according to an example embodiment.

FIG. 10 is a diagram illustrating a process for selecting a candidate destination block when a valid data size is small, according to an example embodiment. FIG. 11 is a diagram illustrating a process of selecting a destination block for a garbage collection from a candidate destination block when a valid data size is small, according to an example embodiment.

Referring to FIGS. 10 and 11, the sub-block managing module 1234 may select a GC destination block 3400 during a small valid data operation. For example, the small valid data operation may refer to a data operation in which valid data may be stored in the smallest free sub-block (e.g., free sub-block 3211).

The sub-block managing module 1234 may manage the free sub-block pool 3200. For example, the free sub-block pool 3200 may include a plurality of free sub-block groups 3210, 3220 to 3290. As another example, each of the free sub-block groups 3210, 3220 to 3290 may include free sub-blocks (FSBs) of the same size.

The sub-block managing module 1234 may calculate a valid data size in a used source block 3113. The sub-block managing module 1234 may calculate a storable size of the free sub-block groups 3210, 3220 to 3290.

The sub-block managing module 1234 may compare the valid data size in the used source block 3113 and the storable size of the free sub-block groups 3210, 3220 to 3290. In FIG. 10, it may be assumed that the valid data size is four (4), a size of first free sub-block 3211 is five (5), a size of second free sub-block 3221 is fifteen (15), and a size of m-th free sub-block 3291 is ten (10).

The sub-block managing module 1234 may compare the valid data size (e.g., four (4)) and the size (e.g., five (5)) of first free sub-block 3211. Since the size of first free sub-block 3211 is larger than the valid data size, the sub-block managing module 1234 may set the first free sub-block 3211 as a candidate destination block (YES$_1$).

The sub-block managing module 1234 may compare the size valid data (e.g., four (4)) and the size (e.g., fifteen (15)) of second free sub-block 3221. Since the size of second free sub-block 3221 is larger than the valid data size, the sub-block managing module 1234 may set the second free sub-block 3221 as the candidate destination block (YES$_2$).

The sub-block managing module 1234 may compare the size valid data (e.g., four (4)) and the size (e.g., ten (10)) of m-th free sub-block 3291. Since the size of m-th free sub-block 3291 is larger than the valid data size, the sub-block managing module 1234 may set the m-th free sub-block 3291 as the candidate destination block (YES$_3$).

The sub-block managing module 1234 may select one of the candidate destination blocks 3211, 3221 to 3291 as the GC destination block 3400.

The sub-block managing module 1234 may manage the free sub-block pool 3200. For example, the free sub-block pool 3200 may include the plurality of free sub-block groups 3210, 3220 to 3290. Each of the free sub-block groups 3210, 3220 to 3290 may include at least one or more free sub-blocks 3211 to 3296. The sub-block managing module 1234 may manage the number of free sub-blocks 3211 to 3296 included in the free sub-block groups 3210, 3220 to 3290.

For example, the first free sub-block group 3210 may include three (3) free sub-blocks 3211, 3212 and 3213. The second free sub-block group 3220 may include four (4) free sub-blocks 3221, 3222, 3223 and 3224. The m-th free sub-block group 3290 may include six (6) free sub-blocks 3291 to 3296.

The sub-block managing module 1234 may select a GC destination block 3400 from the free sub-blocks FSBs of the first free sub-block group 3210 to the m-th free sub-block group 3290. For example, the sub-block managing module 1234 may select the GC destination block 3400 from the m-th free sub-block group 3290 which has the most free sub-blocks 3291 to 3296. For example, the sub-block managing module 1234 may select the free sub-block 3291 from among the free sub-blocks 3291 to 3296 as the GC destination block 3400. For example, the order of free sub-blocks may refer to the order in which a free sub-block is registered in the free sub-block group after data of the free sub-block is erased. Accordingly, the first free sub-block 3211 may be the one added first in the first free sub-block group 3210.

The sub-block managing module 1234 may select a free sub-block in another way. For example, the sub-block managing module 1234 may select the rearmost sub-block (e.g., a free sub-block 3213, 3224 or 3296) as the GC destination block 3400. As another example, the sub-block managing module 1234 may select a free sub-block with the smallest erase count as the GC destination block 3400. As another example, the sub-block managing module 1234 may select a free sub-block with the greatest erase count as the GC destination block 3400. As another example, the sub-block managing module 1234 may select a free sub-block added most previously in the free sub-block group as the GC destination block 3400. As another example, the sub-block managing module 1234 may select a free sub-block added most recently in the free sub-block group as the GC destination block 3400.

Figure 12:
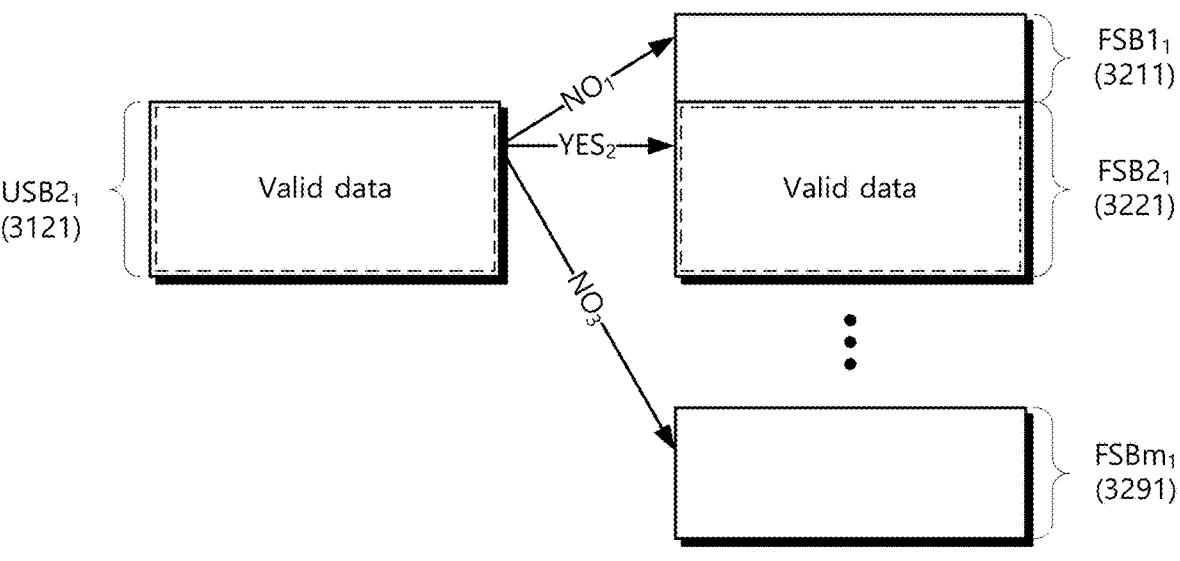
FIG. 12 is a diagram illustrating a process of selecting a candidate destination block when a valid data size is large, according to an example embodiment.
Figure 13:
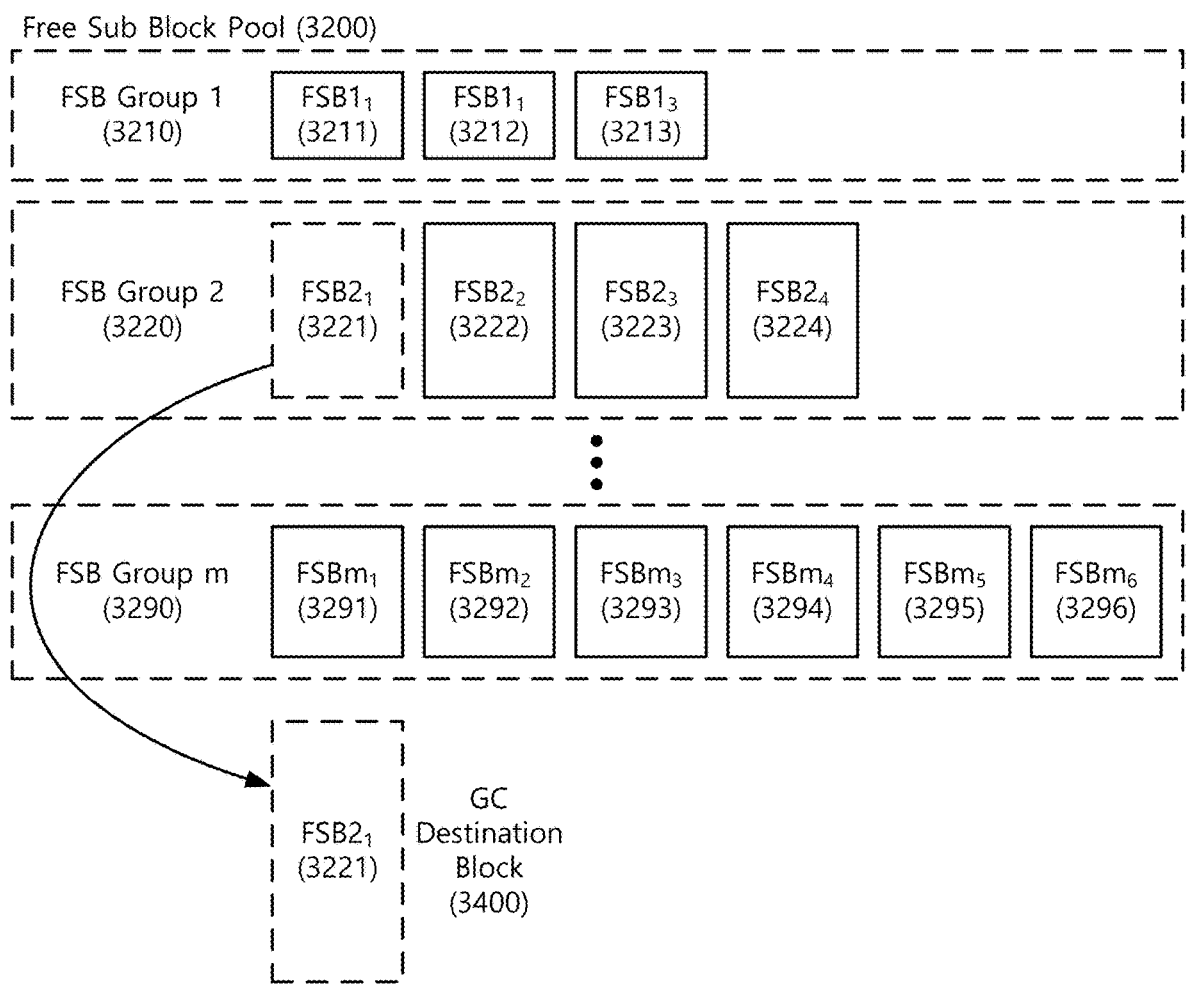
FIG. 13 is a diagram illustrating a process of selecting a destination block for a garbage collection from a candidate destination block when a valid data size is large, according to an example embodiment.

FIG. 12 is a diagram illustrating a process of selecting a candidate destination block when a size of valid data is large, according to an example embodiment. FIG. 13 is a diagram illustrating a process of selecting a destination block for a garbage collection from a candidate destination block when a size of valid data is large, according to an example embodiment.

Referring to FIGS. 12 and 13, the sub-block managing module 1234 may select the GC destination block 3400 during a large valid data operation. For example, the large valid data operation may refer to an operation in which valid data may be stored only in a free sub-block with the largest size (e.g., free sub-block 3221).

The sub-block managing module 1234 may manage the free sub-block pool 3200. For example, the free sub-block pool 3200 may include a plurality of free sub-block groups 3210, 3220 to 3290. As another example, each of the free sub-block groups 3210, 3220 to 3290 may include free sub-blocks (FSBs) of the same size.

The sub-block managing module 1234 may calculate a valid data size in a used source block 3121. The sub-block managing module 1234 may calculate a storable size of the free sub-block groups 3210, 3220 to 3290.

The sub-block managing module 1234 may compare the valid data size in the used source block 3121 and the storable size of the free sub-block groups 3210, 3220 to 3290. In FIG. 12, it may be assumed that the valid data size is ten (10), a size of first free sub-block 3211 is five (5), a size of second free sub-block 3221 is ten (10), and a size of m-th free sub-block 3291 is eight (8).

The sub-block managing module 1234 may compare the valid data size (e.g., ten (10)) and the size (e.g., five (5)) of first free sub-block 3211. Since the size of first free sub-block 3211 is smaller than the valid data size, the sub-block managing module 1234 may exclude the first free sub-block 3211 as a candidate destination block ($NO_1$).

The sub-block managing module 1234 may compare the size valid data (e.g., ten (10)) and the size (e.g., ten (10)) of second free sub-block 3221. Since the size of second free sub-block 3221 is equal to the valid data size, the sub-block managing module 1234 may set the second free sub-block 3221 as the candidate destination block ($YES_2$).

The sub-block managing module 1234 may compare the size valid data (e.g., ten (10)) and the size (e.g., eight (8)) of m-th free sub-block 3291. Since the size of m-th free sub-block 3291 is smaller than the valid data size, the sub-block managing module 1234 may exclude the m-th free sub-block 3291 as the candidate destination block ($NO_3$).

The sub-block managing module 1234 may select the second free sub-block 3221, which is set as the candidate destination block, as the GC destination block 3400.

Figure 14:
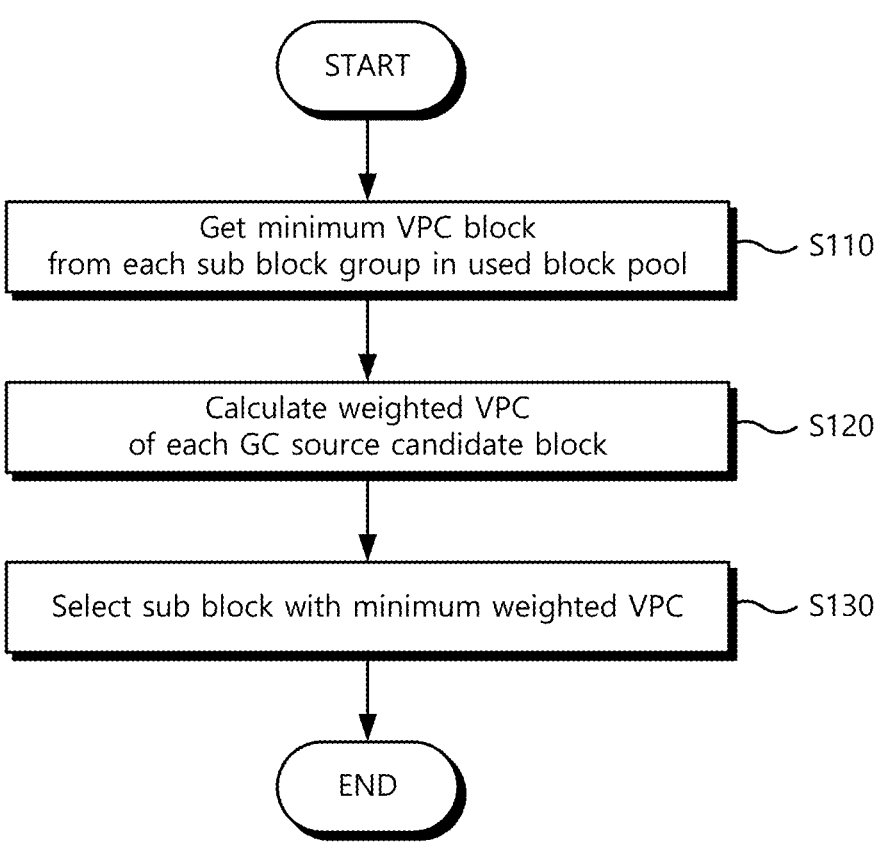
FIG. 14 is a flowchart illustrating a method for selecting a source sub-block, according to an example embodiment.

FIG. 14 is a flowchart illustrating a method for selecting a source sub-block according to an example embodiment.

Referring to FIGS. 8 and 14, the memory controller 1200 of FIG. 1 may select a GC source block from the used sub-block pool illustrated in FIG. 8.

In operation S110, the memory controller 1200 may search for a used sub-block group included in a used sub-block pool. For example, the used sub-block pool may include a plurality of used sub-block groups. As another example, each of the used sub-block groups may include sub-blocks of the same size.

The memory controller 1200 may manage a used sub-block pool 3100. For example, the used sub-block pool 3100 may include a plurality of used sub-block groups (e.g., the first to m-th used sub-block groups 3110 to 3190). Each of the first to m-th used sub-block groups 3110 to 3190 may include at least one or more used sub-blocks 3111 to 3199 (hereinafter referred to as USB). The memory controller 1200 may manage a valid page count (hereinafter referred to as VPC) of the USB. For example, the VPC may refer to the total number of valid pages within one USB.

The memory controller 1200 may search for the USB with the smallest VPC in each used sub-block group of the used sub-block pool 3100. The memory controller 1200 may search for a third used sub-block 3113 ($USB1_3$) in a used sub-block group 1 3110 of the used sub-block pool 3100. The memory controller 1200 may search for a fourth used sub-block 3124 ($USB2_4$) in a used sub-block group 2 3120 of the used sub-block pool 3100. The memory controller 1200 may search for a second used sub-block 3192 ($USBm_2$) in a used sub-block group m 3190 of the used sub-block pool 3100. The memory controller 1200 may find three used sub-blocks 3113, 3124, and 3192 ($USB1_3$, $USB2_4$ and $USBm_2$).

In operation S120, the memory controller 1200 may calculate a weighted valid page count (hereinafter referred to as W-VPC) for the discovered used sub-blocks (USB1$_3$, USB2$_4$ and USBm$_2$).

The memory controller 1200 may calculate the W-VPC according to an equation similar to Equation 3. For example, attributes of a USB may include a valid data size and a size of the USB.

$$\text{Weighted } VPC = K \times \frac{1}{N} \qquad \text{[Equation 3]}$$

Referring to Equation 3, the Weighted VPC may represent the weighted valid page count, K may represent a size of the valid data (VPC), and N may represent a size of the used sub-blocks.

According to Equation 3, the W-VPC may become smaller as the valid data decreases. Additionally, the W-VPC may decrease as the size of the USB increases. Small valid data and a large USB may indicate that there are many unused pages (invalid pages) in the USB.

The memory controller 1200 may calculate a W-VPC. For example, when a valid data size K is two (2) and a size N of the USB is five (5) in the USB1$_3$, a W-VPC may be equal to 0.4. When a valid data size K of two (2) and a size N of the USB is fifteen (15) in the USB2$_4$, the W-VPC may be equal to 0.134. When a valid data size K of two (2) and a size N of the USB is ten (10) in the USBm$_2$, the W-VPC may be equal to 0.2.

In operation S130, the memory controller 1200 may compare the W-VPCs of the USBs. The memory controller 1200 may search for a USB with the smallest W-VPC as a result of the comparison. The memory controller 1200 may select the searched used sub-block as a GC source block.

The sub-block managing module 1234 may select the smallest 0.134 among 0.4 which is the W-VPC of the USB1$_3$, 0.134 which is the W-VPC of the USB2$_4$ and 0.2 which is the W-VPC of the USBm$_2$. Accordingly, the sub-block managing module 1234 may select the USB2$_4$ of the used sub-block group 2 3120 as the GC source block.

The memory controller 1200 may calculate a W-VPC according to an equation similar to Equation 4. For example, attributes of a USB may include a valid data size, a size of the USB and an attribute weight of the USB.

$$\text{Weighted } VPC = K \times \frac{1}{N} \times \alpha \qquad \text{[Equation 4]}$$

Referring to Equation 4, the Weighted VPC may represent the weighted valid page count, K may represent a size of the valid data (VPC), N may represent a size of the used sub-blocks, and a may represent an attribute weight of the used sub-blocks.

For example, the attributes of the USB may include an erase count. When the erase count is high, the memory controller 1200 may increase the attribute weight a of the USB. As the attribute weight a of the USB increases, the W-VPC may also increase, thus a possibility that the USB is selected may lower (decrease). Therefore, a reuse count of the USB may be maintained.

Figure 15:
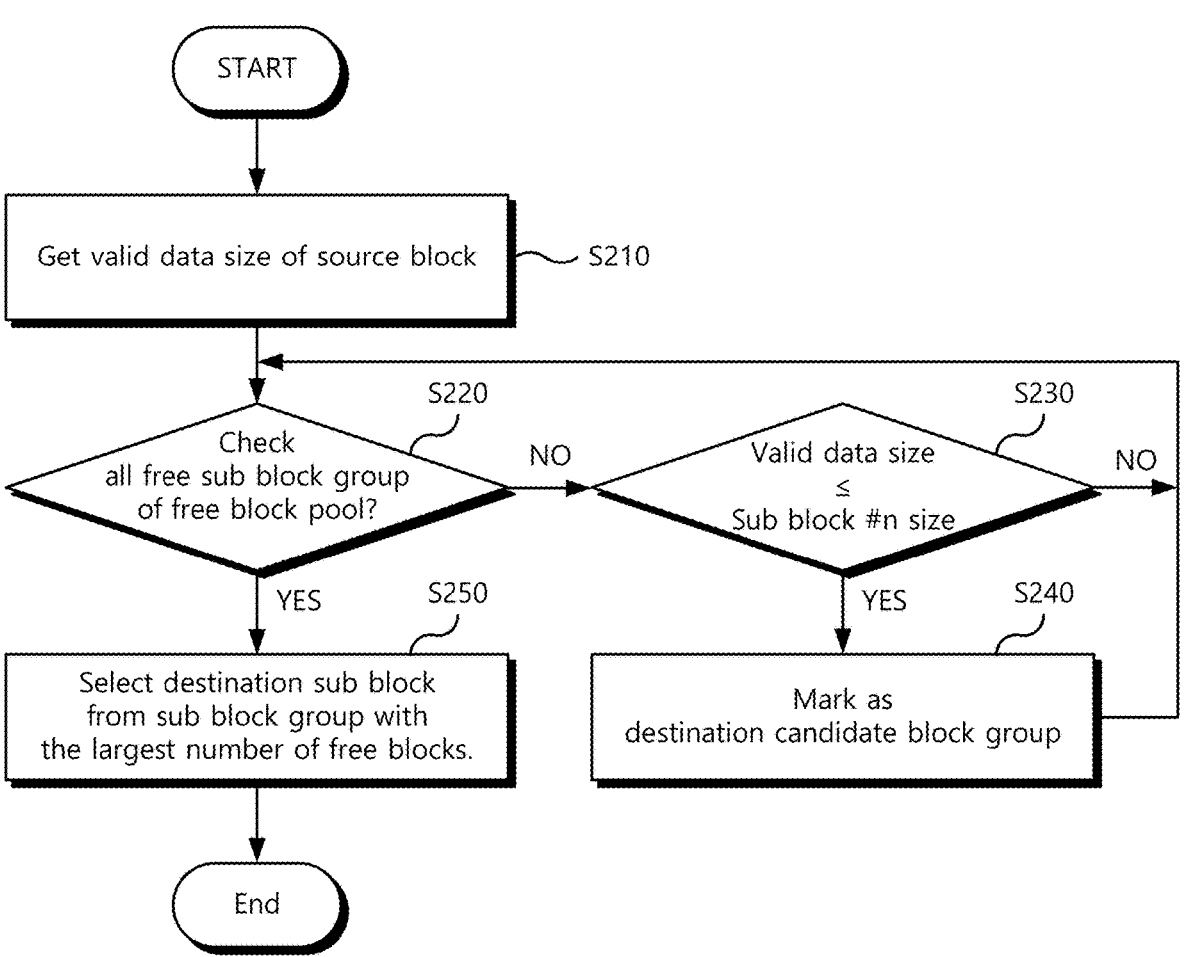
FIG. 15 is a flowchart illustrating a method of selecting a destination sub-block, according to an example embodiment.

FIG. 15 is a flowchart illustrating a method of selecting a destination sub-block according to an example embodiment. Referring to FIG. 15, the memory controller 1200 may select a GC destination block from a free sub-block pool. For example, the free sub-block pool may include a plurality of free sub-block groups. Each of the free sub-block groups may include at least one or more free sub-blocks (hereinafter referred to as FSBs) as the same size.

In operation S210, the memory controller 1200 may obtain the valid data size from a GC source block. For example, the GC source block may refer to a sub-block selected from the USBs.

In operation S220, the memory controller 1200 may check whether sizes of FSBs in all free sub-block groups of the free-sub-block pool are compared.

When there are still a free sub-block group to be compared (NO in operation S220), the memory controller 1200 may compare the valid data size and the size of the FSB (operation S230).

When it is confirmed that the sizes of FSBs have been compared for all free sub-block groups (YES in operation S220), the memory controller 1200 may select a GC destination block (operation S250).

In operation S230, the memory controller 1200 may compare the valid data size and the size of FSB in the free sub-block group.

When the valid data size is smaller than or equal to the size of FSB in the free sub-block group (YES in operation S230), the memory controller 1200 may set the FSB as a candidate destination block (operation S240).

When the valid data size is greater than the size of FSB in the free sub-block group (NO in operation S230), the memory controller 1200 may exclude the free sub-block group including the FSB from the candidate destination block (operation S220).

In operation S240, the memory controller 1200 may set an FSB having a size that is greater than or equal to the valid data size as a candidate destination block.

For example, it may be assumed that the valid data size is four (4), a size of FSB1 is five (5), a size of FSB2 is fifteen (15) and a size of FSB3 is ten (10).

The memory controller 1200 may compare the valid data size (e.g., four (4)) and the size of FSB1 (e.g., five (5)). Since the size of FSB1 is larger than the valid data size, the memory controller 1200 may set the FSB1 as the candidate destination block.

The memory controller 1200 may compare the valid data size (e.g., four (4)) and the size of FSB2 (e.g., fifteen (15)). Since the size of FSB2 is larger than the valid data size, the memory controller 1200 may set the FSB2 as the candidate destination block.

The memory controller 1200 may compare the valid data size (e.g., four (4)) and the size of FSB3 (e.g., 10). Since the size of FSB3 is larger than the valid data size, the memory controller 1200 may set the FSB3 as the candidate destination block.

In operation S250, the memory controller 1200 may select one of the candidate destination blocks as a GC destination block.

The memory controller 1200 may search for a free sub-block group with the largest number of FSBs among candidate destination blocks. The memory controller 1200 may select an FSB of the searched free sub-block group as a GC destination block.

For example, the memory controller 1200 may check three (3) FSBs in free sub-block group 1. The memory controller 1200 may check four (4) FSBs in free sub-block group 2. The memory controller 1200 may check six (6) FSBs in free sub-block group 3.

The memory controller 1200 may select a GC destination block from three (3) FSBs, four (4) FSBs, or six (6) FSBs.

For example, the memory controller 1200 may select the GC destination block from the free sub-block group 3, which has six (6) FSBs and has a relatively large amount of free space. For example, the memory controller 1200 may select the FSB3₁ from the free sub-block group 3 as the GC destination block.

For example, the memory controller 1200 may select an FSB in another way. The memory controller 1200 may select the rearmost FSB as the GC destination block. As another example, the memory controller 1200 may select an FSB with the smallest erase count as the GC destination block. As another example, memory controller 1200 may select an FSB with the greatest erase count as the GC destination block. As another example, the memory controller 1200 may select an FSB added most previously in the free sub-block group as the GC destination block. As another example, the memory controller 1200 may select an FSB added most recently in the free sub-block group as the GC destination block.

According to the present disclosure, it may be possible to improve garbage collection input and output fluctuation (GC I/O fluctuation) and write amplification factor (WAF) degradation through sub-block management.

While the present disclosure has been described with reference to embodiments thereof, it is to be apparent to those of ordinary skill in the art that various changes and modifications may be made thereto without departing from the spirit and scope of the present disclosure as set forth in the following claims.

What is claimed is:

1. A sub-block-based storage device, comprising:
a memory device configured to include a plurality of memory blocks;
a work memory storing instructions; and
a memory controller communicatively coupled with the memory device and the work memory and configured to manage the plurality of memory blocks,
wherein each block of the plurality of memory blocks comprises a plurality of sub-blocks having different capacities,
wherein the memory controller is configured to execute the instructions to:
manage used sub-blocks which store valid data from among the plurality of sub-blocks;
manage free sub-blocks which are empty from among the plurality of sub-blocks;
select a garbage collection source block from the used sub-blocks;
select candidate destination blocks by comparing a size of valid data stored in the garbage collection source block and each of sizes of the free sub-blocks; and
select a garbage collection destination block from the candidate destination blocks.

2. The sub-block-based storage device of claim 1, wherein the memory controller is further configured to execute the instructions to:
divide the used sub-blocks into used sub-block groups based on a size of each of the used sub-blocks, and
manage a used sub-block pool comprising the used sub-block groups.

3. The sub-block-based storage device of claim 2, wherein the memory controller is further configured to execute the instructions to:
manage the valid data stored in the used sub-blocks.

4. The sub-block-based storage device of claim 3, wherein the memory controller is further configured to execute the instructions to:

calculate a weighted valid page count of each of the used sub-blocks as follows:

$$\text{Weighted } VPC = K \times \frac{1}{N},$$

wherein Weighted VPC represents the weighted valid page count, K represents a size of the valid data, and N represents a size of the used sub-blocks.

5. The sub-block-based storage device of claim 4, wherein the memory controller is further configured to execute the instructions to:
select, from each of the used sub-block groups, a corresponding used sub-block storing a smallest amount of valid data;
calculate the weighted valid page count of each of the selected used sub-blocks;
compare the weighted valid page counts of the selected used sub-blocks; and
select, as the garbage collection source block, a used sub-block with a smallest weighted valid page count from among the selected used sub-blocks.

6. The sub-block-based storage device of claim 3, wherein the memory controller is further configured to execute the instructions to:
calculate a weighted valid page count of each of the used sub-blocks as follows:

$$VPC = K \times \frac{1}{N} \times \alpha,$$

wherein Weighted VPC represents the weighted valid page count, K represents a size of the valid data, N represents a size of the used sub-blocks, and a represents an attribute weight of the used sub-blocks.

7. The sub-block-based storage device of claim 1, wherein the memory controller is further configured to execute the instructions to:
divide the free sub-blocks into free sub-block groups based on a size of each of the free sub-blocks, and
manage a free sub-block pool comprising the free sub-block groups.

8. The sub-block-based storage device of claim 7, wherein the memory controller is further configured to execute the instructions to:
manage a number of the free sub-blocks in each of the free sub-block groups, and
manage the size of the free sub-blocks in each of the free sub-block groups.

9. The sub-block-based storage device of claim 8, wherein the memory controller is further configured to execute the instructions to:
compare the size of valid data stored in the garbage collection source block and sizes of the free sub-blocks in each of the free sub-block groups, respectively, and
select, as a candidate destination block, a free sub-block having a size greater than a size of the valid data stored in the garbage collection source block.

10. The sub-block-based storage device of claim 9, wherein the memory controller is further configured to execute the instructions to:
calculate a number of free sub-blocks comprised in each of free sub-block groups that comprise the candidate destination block;

select a free sub-block group comprising a maximum number of free sub-blocks from among the free sub-block groups that comprise the candidate destination block; and select, as the garbage collection destination block, a first free sub-block from the free sub-block group comprising the maximum number of free sub-blocks.

11. A sub-block-based memory management method, comprising:

selecting a garbage collection source block from among used sub-blocks storing valid data, the used sub-blocks being divided into used sub-block groups based on a size of each of the used sub-blocks;

selecting candidate destination blocks from free sub-blocks based on a size of the valid data stored in the garbage collection source block; and selecting a garbage collection destination block from among the candidate destination blocks.

12. The sub-block-based memory management method of claim 11, wherein the selecting of the garbage collection source block comprises:

calculating a weighted valid page count of each of the used sub-blocks as follows:

$$\text{Weighted } VPC = K \times \frac{1}{N},$$

wherein Weighted VPC represents the weighted valid page count, K represents a size of the valid data, and N represents a size of the used sub-blocks.

13. The sub-block-based memory management method of claim 12, wherein the selecting of the garbage collection source block further comprises:

selecting, from each of the used sub-block groups, a corresponding used sub-block storing a smallest amount of the valid data;

calculating the weighted valid page count of each of the selected used sub-blocks;

comparing the weighted valid page counts of the selected used sub-blocks; and selecting, as the garbage collection source block, a used sub-block with a smallest weighted valid page count from among the selected used sub-blocks.

14. The sub-block-based memory management method of claim 11, wherein the selecting of the candidate destination blocks comprises:

dividing the free sub-blocks into free sub-block groups based on a size of each of the free sub-blocks, and managing a free sub-block pool comprising the free sub-block groups.

15. The sub-block-based memory management method of claim 14, wherein the selecting of the candidate destination blocks further comprises:

comparing the size of the valid data stored in the garbage collection source block and sizes of the free sub-blocks in each of the free sub-block groups, respectively, and selecting, as a candidate destination block, a free sub-block having a size greater than a size of the valid data stored in the garbage collection source block, wherein the selecting of the garbage collection destination block comprises:

calculating a number of free sub-blocks comprised in each of free sub-block groups that comprise the candidate destination blocks;

selecting a free sub-block group comprising a maximum number of free sub-blocks from among the free sub-block groups that comprise the candidate destination blocks; and selecting, as the garbage collection destination block, a first free sub-block from the free sub-block group comprising the maximum number of free sub-blocks.

16. A sub-block-based storage device, comprising:

a memory device configured to include a plurality of memory blocks, each block of the plurality of memory blocks comprising a plurality of sub-blocks having different capacities;

a work memory storing instructions; and a memory controller communicatively coupled with the memory device and the work memory and configured to manage the plurality of memory blocks, wherein the memory controller is configured to execute instructions to:

manage a used sub-block pool comprising used sub-block groups, each of the used sub-block groups comprising used sub-blocks storing valid data;

manage a free sub-block pool comprising free sub-block groups, each of the free sub-block groups storing free sub-blocks that are empty;

select a garbage collection source block from the used sub-blocks;

select candidate destination blocks from the free sub-blocks; and select a garbage collection destination block from the candidate destination blocks.

17. The sub-block-based storage device of claim 16, wherein the memory controller is further configured to execute the instructions to:

divide the used sub-blocks into the used sub-block groups based on a size of each of the used sub-blocks;

divide the free sub-blocks into the free sub-block groups based on a size of each of the free sub-blocks;

manage a number of the free sub-blocks in each of the free sub-block groups; and manage a size of the free sub-blocks in each of the free sub-block groups.

18. The sub-block-based storage device of claim 17, wherein the memory controller is further configured to execute the instructions to:

calculate a weighted valid page count of each of the used sub-blocks as follows:

$$\text{Weighted } VPC = K \times \frac{1}{N},$$

wherein Weighted VPC represents the weighted valid page count, K represents a size of the valid data, and N represents a size of the used sub-blocks.

19. The sub-block-based storage device of claim 18, wherein the memory controller is further configured to execute the instructions to:

compare a size of the valid data stored in the garbage collection source block and sizes of the free sub-blocks in each of the free sub-block groups, respectively; and select, as a candidate destination block, a free sub-block having a size greater than a size of the valid data stored in the garbage collection source block.

20. The sub-block-based storage device of claim 19, wherein the memory controller is further configured to execute the instructions to:

calculate a number of free sub-blocks comprised in each
of free sub-block groups that comprise the candidate
destination block;

select a free sub-block group comprising a maximum
number of free sub-blocks from among the free sub-
block groups that comprise the candidate destination
block; and select, as the garbage collection destination block, a first
free sub-block from the free sub-block group compris-
ing the maximum number of free sub-blocks.

* * * * *